United States Patent
Zhou et al.

(10) Patent No.: US 9,350,483 B2
(45) Date of Patent: May 24, 2016

(54) MITIGATE ADJACENT CHANNEL INTERFERENCE AND NON-WI-FI INTERFERENCE

(71) Applicant: QUALCOMM Incorporated, San Diego, CA (US)

(72) Inventors: Yan Zhou, San Diego, CA (US); George Cherian, San Diego, CA (US); Santosh Paul Abraham, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 162 days.

(21) Appl. No.: 14/155,880

(22) Filed: Jan. 15, 2014

(65) Prior Publication Data

US 2015/0201419 A1    Jul. 16, 2015

(51) Int. Cl.
| | | |
|---|---|---|
| *H04L 1/00* | (2006.01) | |
| *H04W 72/02* | (2009.01) | |
| *H04W 84/12* | (2009.01) | |
| *H04W 72/08* | (2009.01) | |

(52) U.S. Cl.
CPC .................. *H04L 1/00* (2013.01); *H04W 72/02* (2013.01); *H04W 72/082* (2013.01); *H04W 84/12* (2013.01)

(58) Field of Classification Search
None
See application file for complete search history.

(56) References Cited

U.S. PATENT DOCUMENTS

| | | | |
|---|---|---|---|
| 9,112,569 B2 * | 8/2015 | Haub et al. | |
| 2004/0001427 A1 * | 1/2004 | Belotserkovsky et al. | ... 370/208 |
| 2009/0073925 A1 * | 3/2009 | Rentel et al. | ........... 370/329 |
| 2010/0002815 A1 * | 1/2010 | Yan | ............ 375/350 |
| 2010/0248630 A1 * | 9/2010 | Abraham et al. | ........... 455/59 |
| 2011/0267937 A1 | 11/2011 | Yoo et al. | |
| 2012/0224484 A1 * | 9/2012 | Babiarz et al. | ........... 370/235 |
| 2012/0236736 A1 * | 9/2012 | Frank et al. | ........... 370/252 |
| 2012/0257519 A1 | 10/2012 | Frank et al. | |
| 2012/0257585 A1 | 10/2012 | Sydor et al. | |
| 2012/0270582 A1 | 10/2012 | Mese et al. | |
| 2012/0320729 A1 | 12/2012 | Jung et al. | |
| 2013/0012134 A1 | 1/2013 | Jin et al. | |
| 2013/0017794 A1 | 1/2013 | Kloper et al. | |
| 2013/0017818 A1 | 1/2013 | Rofougaran | |
| 2013/0090119 A1 | 4/2013 | Sharony et al. | |
| 2013/0150035 A1 | 6/2013 | Chande et al. | |
| 2013/0171955 A1 | 7/2013 | Makhlouf et al. | |
| 2013/0194982 A1 | 8/2013 | Fwu et al. | |
| 2013/0202063 A1 | 8/2013 | Reial et al. | |
| 2013/0223359 A1 | 8/2013 | Kenney et al. | |
| 2013/0272170 A1 | 10/2013 | Chatterjee et al. | |
| 2013/0272227 A1 | 10/2013 | Gallagher et al. | |
| 2013/0272228 A1 | 10/2013 | Gallagher et al. | |
| 2014/0307571 A1 * | 10/2014 | Herzen et al. | ........... 370/252 |
| 2015/0201419 A1 * | 7/2015 | Zhou et al. | ........... 370/329 |

* cited by examiner

*Primary Examiner* — Benjamin H Elliott, IV
(74) *Attorney, Agent, or Firm* — Holland & Hart LLP

(57) ABSTRACT

Devices, systems and methods are described for mitigating interference in a wireless communications network. In particular, the network may be a Wi-Fi network. Multiple approaches may be implemented to mitigate ACI. Further, multiple approaches may be implemented to mitigate non-Wi-Fi interference as well. Each of the approaches may consist of two parts, namely, interference detection and interference mitigation (or reduction). One approach may involve: detecting adjacent channel interference (ACI) in an operating channel of the device; determining a location of the detected ACI in an operating band of the device; and mitigating the detected ACI by communicating via a channel different from the operating channel, the different channel being determined to be further away from the location of the detected ACI.

16 Claims, 19 Drawing Sheets

MITIGATE ADJACENT CHANNEL INTERFERENCE AND NON-WI-FI INTERFERENCE

BACKGROUND

The following relates generally to wireless communication, and more specifically to interference in Wi-Fi networks. Wireless communications systems are widely deployed to provide various types of communication content such as voice, video, packet data, messaging, broadcast, and so on. These systems may be multiple-access systems capable of supporting communication with multiple users by sharing the available system resources (e.g., time, frequency, and power). Examples of such multiple-access systems include code-division multiple access (CDMA) systems, time-division multiple access (TDMA) systems, frequency-division multiple access (FDMA) systems, and orthogonal frequency-division multiple access (OFDMA) systems.

Multiple access wireless systems may have various topologies. In one topology, known as a wireless wide area network (WWAN) or cellular system, the system includes a number of base stations that collectively provide coverage for a metropolitan or regional geographic area (e.g., cities, national, etc.). Each base station has a coverage range, which may be referred to as the coverage area of the cell. In another topology known as a wireless local area network (WLAN), an access point forms a network for devices within a local coverage area (e.g., building, house, etc.), and may provide connectivity through the access point to other networks (e.g., the Internet, etc.). WLAN networks employing the IEEE 802.11 family of communication standards are widely deployed and used. A particular implementation of Wi-Fi, Wi-Fi Direct, also known as P2P, is a standard that enables devices to connect easily with each other at Wi-Fi data transfer rates without requiring a dedicated Wi-Fi access point (hard AP). In this technique, a Wi-Fi-Direct enabled device (e.g., a P2P device) can be elected to operate as a soft-AP or Group Owner (GO) for communications with other Wi-Fi devices. In some implementations, the P2P GO can also be used in conjunction with one or more APs to effectively extend the AP(s)'s coverage, adapt to different communication path conditions, and increase throughput of the system.

WLAN systems, such as those employing the IEEE 802.11 family of standards (e.g., Wi-Fi), may use channel sense multiple access (CSMA), in which devices or stations (STA) sense channel conditions prior to accessing the channel. In WLAN systems, access points (AP) may be communicating with several or many other STAs concurrently, and therefore data transfers may be interrupted by periods where the AP is serving other STAs.

In general, wireless communication networks may experience various types of interference, which can degrade network performance. Many approaches have been considered for reducing interference in Wi-Fi networks in particular. Another source of interference in Wi-Fi networks is non-Wi-Fi communications or signals, such as LTE (Long Term Evolution), microwaves, and Bluetooth. Interference from non-Wi-Fi sources also cannot be solved by conventional approaches because such sources do not comply with Wi-Fi deferring rules.

SUMMARY

The described features generally relate to one or more improved systems, methods, and/or apparatuses for mitigating interference in a wireless communications network, and particularly in a Wi-Fi network. In general, approaches for mitigating adjacent channel interference (ACI) and approaches for mitigating non-Wi-Fi interference are disclosed. In one example, ACI may be detected in an operating channel of a device. A location of the detected ACI in the operating band of the device may be determined The detected ACI may be mitigated by communicating via a channel different from the operating channel. The different channel may be determined to be further away from the location of the detected ACI.

A method performed by a device of a Wi-Fi network for mitigating interference is described. In one configuration, the method may involve detecting adjacent channel interference (ACI) in an operating channel of the device and determining a location of the detected ACI in the operating band of the device. The method may further involve mitigating the detected ACI by communicating via a channel different from the operating channel. The different channel may be determined to be further away from the location of the detected ACI.

In some embodiments, determining the location of the detected ACI may involve determining on which bandwidth side of the operating channel the detected ACI is located. In such embodiments, mitigating the detected ACI may involve communicating via a channel on an opposite bandwidth side of the operating channel from the detected ACI.

In other embodiments, determining the location of the detected ACI may involve identifying at least one ACI channel as a channel contributing to the ACI. In such embodiments, identifying the at least one ACI channel may involve tuning to non-operating channels to identify one or more channels contributing to the ACI.

In still other embodiments, determining the location of the detected ACI may involve communicating with at least one other device over a common control channel to obtain information regarding at least one ACI channel contributing to the ACI.

In some embodiments, mitigating the detected ACI may involve determining the channel different from the operating channel for the communicating, and tuning to the determined channel. In some embodiments, mitigating the detected ACI by tuning to the channel different from the operating channel for the communicating may be based at least in part on a message received from an access point serving the device.

In some embodiments, the method may further involve detecting non-Wi-Fi interference. In such embodiments, the method may also involve mitigating the non-Wi-Fi interference based at least in part on an interference type classification of the non-Wi-Fi interference.

Alternatively or additionally, the method may involve mitigating the non-Wi-Fi interference by indicating for a user to take action to mitigate the non-Wi-Fi interference. In such embodiments, indicating for the user to take action may involve indicating for the user to turn off at least one of a non-Wi-Fi device and a non-Wi-Fi application. Alternatively or additionally, indicating for the user to take action may involve indicating for the user to move away from a current location. In some embodiments, indicating for the user to move away from a current location may involve indicating for the user to move to a location identified as having less non-Wi-Fi interference.

A device of a Wi-Fi network is described. In one configuration, the device may include means for detecting adjacent channel interference (ACI) in an operating channel of the device, and means for determining a location of the detected ACI in an operating band of the device. The device may further include means for mitigating the detected ACI by communicating via a channel different from the operating channel. In some embodiments, the different channel may be determined to be further away from the location of the detected ACI.

Another device of a Wi-Fi network is also described. The device may include a processor, memory in electronic communication with the processor, and instructions stored in the memory. The instructions may be executable by the processor to: detect adjacent channel interference (ACI) in an operating channel of the device; determine a location of the detected ACI in an operating band of the device; and, mitigate the detected ACI by communicating via a channel different from the operating channel. In some embodiments, the different channel may be determined to be further away from the location of the detected ACI.

Further scope of the applicability of the described methods and apparatuses will become apparent from the following detailed description, claims, and drawings. The detailed description and specific examples are given by way of illustration only, since various changes and modifications within the spirit and scope of the description will become apparent to those skilled in the art.

BRIEF DESCRIPTION OF THE DRAWINGS

A further understanding of the nature and advantages of the present invention may be realized by reference to the following drawings. In the appended figures, similar components or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

Figure 1:
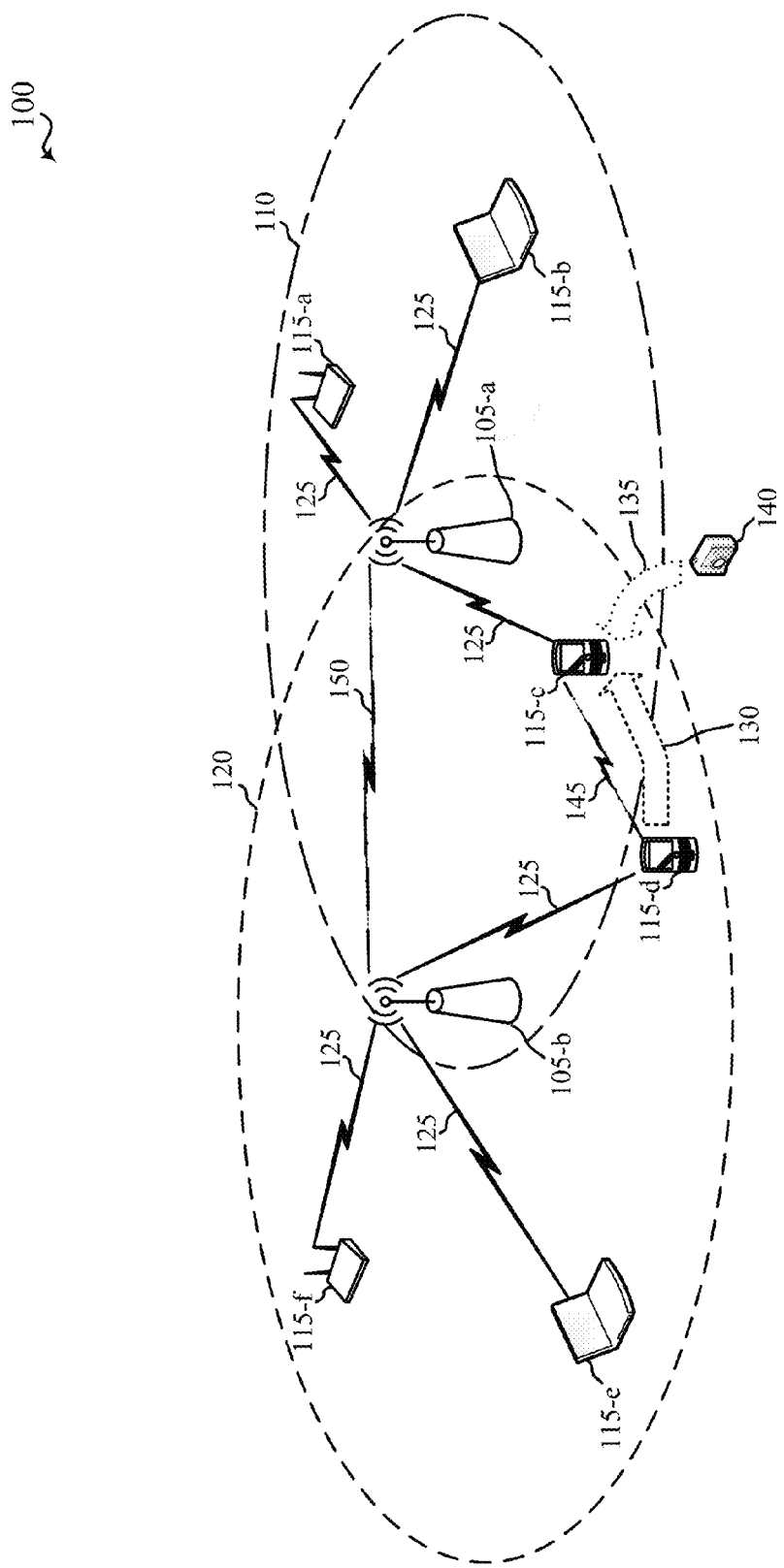
FIG. 1 shows a block diagram of a wireless communications system in accordance with various embodiments.

The features described herein describe various approaches to mitigating interference in wireless communications networks. Each of the approaches described herein may consist of two parts, namely, interference detection and interference mitigation (or reduction).

A particular source of interference is referred to as adjacent channel interference (ACI). An example of ACI may be described as follows. A first access point (AP) serves a first station (e.g., user equipment, such as a smartphone, a tablet, a PC, etc.) in a downlink channel (CH1), which may be "jammed" by ACI from a neighboring station operating on an adjacent channel (CH2) with a second access point (AP). This type of interference may be referred to as "leak" interference because the wireless signals on CH2 may leak onto CH1. This ACI problem cannot be solved by conventional approaches, such as request-to-send/clear-to-send (RTS/CTS), because the stations are served by different APs on different channels.

One existing solution for mitigating ACI is to have a device experiencing interference (e.g., experiencing poor performance) switch to another channel that is relatively free from interference (i.e., a "clean" channel). However, this solution is infeasible if no clean channel exists to which the device may switch. This may be the case particularly in the 2.4GHz band where bandwidth is relatively limited and the number of operating devices is relatively large. Further, finding a clean channel may involve a search of many candidate channels, wasting time and/or resources.

Another possible solution for mitigating ACI is to have the device experiencing interference use sharper transmission/reception filters to minimize the ACI. However, this approach may be relatively difficult to implement, and the costs may be considerably high, even if feasible.

In general, ACT may be detected by monitoring or otherwise determining performance of a wireless communications device. When the device experiences poor performance, such as relatively low throughput, the device may be considered to be suffering from ACI. Alternatively or additionally, ACT may be detected using one or more of the following techniques: (1) a device may detect ACT in its base station/AP operating (serving) channel (this technique may generally be referred to herein as "in-band detection"); (2) a device may tune to non-operating channels to identify the channel causing or contributing to the ACI (this technique may generally be referred to herein as "identification of ACI channel"); and, (3) the base station/AP serving the device suffering from ACT may detect (and mitigate) ACT via messages over a commonly agreed control channel (this technique may generally be referred to herein as "common control channel").

For mitigating ACT, one or more of the following techniques may be employed: (1) the base station/AP serving the device suffering from ACT may switch to a channel that is further away from the ACT channel in the operating band, the base station/AP may switch to a channel on a bandwidth side opposite detected ACI, or the device itself may switch to another base station/AP operating on a non-ACI channel (this technique may generally be referred to herein as "tuning away from ACI"); (2) the base station/AP serving the device suffering from ACI may extend the operating channel to include the ACT channel, with the base station/AP serving the device either on the extended operating channel or only on the ACT channel, and the base station/AP serving non-suffering device(s) on the original operating channel (this technique may generally be referred to herein as "ACT channel combining"); (3) the base station/AP serving the device suffering from ACI may select the ACT channel as the operating channel, with the base station/AP serving both the device and non-suffering device(s) on the selected ACI channel (this technique may generally be referred to herein as "selecting ACI channel"); (4) the base station/AP serving the device suffering from ACT may avoid using OFDM (orthogonal frequency-division multiplexing) tones affected by ACT, which may involve reconfiguration of the channel to have a reduced bandwidth (this technique may generally be referred to herein as "using partial channel bandwidth"); (5) the device suffering from ACI may coordinate with the interfering device(s) to mitigate ACI, which may involve using orthogonal time slots, switching to the same base station/AP, or moving at least one of the devices to a different channel (this technique may generally be referred to herein as "coordinating device-to-device"); and, (6) the base station/AP serving the device suffering from ACI may coordinate with the interfering base station/AP to mitigate ACI, which may involve using orthogonal time slots, switching devices to the same base station/AP, or moving at least one of the devices to a different channel (this technique may generally be referred to herein as "coordinating between base stations/APs").

Although the foregoing approaches may mitigate both ACI and non-Wi-Fi interference, additional approaches to detect and mitigate non-Wi-Fi interference may be employed. For detecting non-Wi-Fi interference, a device experiencing poor performance may not detect relatively strong Wi-Fi interference (such as ACI) on its operating channel and nearby channels (excluding possible Wi-Fi interference causation). For mitigating non-Wi-Fi interference, one or more of the following techniques may be employed: (1) mitigating based on interference type classification (e.g., Bluetooth, LTE, microwave, etc.); (2) indicating for a user of the device to turn off non-Wi-Fi devices; and, (3) indicating for a user to move to another location that has less interference.

The following description provides examples, and is not limiting of the scope, applicability, or configuration set forth in the claims. Changes may be made in the function and arrangement of elements discussed without departing from the spirit and scope of the disclosure. Various embodiments may omit, substitute, or add various procedures or components as appropriate. For instance, the methods described may be performed in an order different from that described, and various steps may be added, omitted, or combined. Also, features described with respect to certain embodiments may be combined in other embodiments.

Referring first to FIG. 1, a wireless communication system 100 is depicted in accordance with various embodiments. The system 100 may include a plurality of base stations or access points 105 and a plurality of wireless communication devices 115. The access points 105 may communicate with various ones of the communication devices 115 under the control of a controller (not shown), which may be part of a core network (not shown) or the access points 105 in various embodiments. In some embodiments, the access points 105 may communicate, either directly or indirectly, with each other over backhaul links (not shown), which may be wired or wireless communication links. The system 100 may support operation on multiple carriers (waveform signals of different frequencies). Multi-carrier transmitters may transmit modulated signals simultaneously on the multiple carriers. For example, each communication link 125 may be a multi-carrier signal modulated according to the various radio technologies described above. Each modulated signal may be sent on a different carrier and may carry control information (e.g., reference signals, control channels, etc.), overhead information, data, etc.

The access points 105 may wirelessly communicate with the devices 115 via one or more antennas. Each of the access points 105 may provide communication coverage for a respective geographic area. As illustrated in FIG. 1, the access point 105-a may have a coverage area 110-a, and the access point 105-b may have a different coverage area 110-b. In some embodiments, access points 105 may be referred to as a base transceiver station, a radio base station, a radio transceiver, a basic service set (BSS), an extended service set (ESS), a NodeB, eNodeB (eNB), Home NodeB, a Home eNodeB, or some other suitable terminology. The coverage area 110 for an access point 105 may be divided into sectors making up only a portion of the coverage area (not shown). The system 100 may include access points 105 of different types (e.g., macro, micro, and/or pico). There may be overlapping coverage areas for different technologies.

In some embodiments, the system 100 is a Wi-Fi network. The terms access point (AP) and user equipment (UE) may be generally used to describe the access points 105 and the wireless devices 115, respectively.

The UEs 115 are dispersed throughout the system 100, and each UE may be stationary or mobile. A UE 115 may also be referred to by those skilled in the art as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. The UE 115 may operate concurrently with a cellular network and with another network such as WLAN or a Wi-Fi network (i.e., the UE 115 may also operate as a station or STA). A UE 115 may be a cellular phone, a personal digital assistant (PDA), a wireless modem, a wireless communication device, a handheld device, a tablet computer, a laptop computer, a cordless phone, a wireless local loop (WLL) station, or the like. A UE may be able to communicate with macro eNBs, pico eNBs, femto eNBs, relays, APs and the like.

When the wireless devices (UEs) 115 in system 100 communicate with a WLAN or Wi-Fi network, communication links 125 may include uplink and downlink transmission between the wireless devices 115 and an AP 105-a or 105-b providing communication coverage, depending at least in part on the geographic location of the devices relative to the respective coverage areas 110-a, 110-b of the APs. In this example, wireless devices 115-a, 115-b and 115-c may communicate with the AP 105-a because they are in the coverage area 110 of AP 105-a. Similarly, wireless devices 115-d, 115-e and 115-f may communicate with the AP 105-b because they are in the coverage area 110-b of AP 105-b. Although the device 115-c is also within the coverage area 110-b of AP 105-b, the device 115-c may be in communication with the AP 105-a because the device 115-c is geographically closer to the AP 105-a, the AP 105-a has a stronger signal, or various other reasons.

The wireless devices 115 may include multiple radios or modems (not shown) to allow it to communicate with the Wi-Fi network. However, because not all of the wireless devices 115 are being serviced by a common AP 105, concurrent communications may occur and, may result in interference. For example, the wireless device 115-c may experience interference 130 in its operating channel (represented by link 125 to the AP 105-a) because of communications between the wireless device 115-d and the AP 105-b. This type of interference may be referred to as adjacent channel interference (ACI). Alternatively or additionally, the wireless device 115-c may experience interference 130 in its operating channel because of transmissions from or to a non-Wi-Fi devices 140. Examples of the non-Wi-Fi device may include, but are not limited to, digital cameras, Bluetooth communication devices, microwave devices, cellular communication devices (e.g., operating on LTE), and the like.

In some embodiments of the system 100, various mechanisms may be used to allow for effective coexistence of the wireless devices 115, as well as effective communications using the wireless devices 115 in the presence of signals of non-Wi-Fi devices. In general, various mechanisms may be employed for mitigating or even removing the impact that such interference may have on the performance of the wireless devices 115.

When the wireless device 115-c experiences interference, whether from other Wi-Fi devices or non-Wi-Fi devices, the device 115-c may experience poor performance. Thus, interference may be detected by monitoring or otherwise determining performance of the wireless device 115-c. When the device 115-c experiences poor performance, such as relatively low throughput, the device 115-c may be considered to be suffering from ACI.

Alternatively or additionally, the wireless device 115-c may measure a signal-to-interference-plus-noise ratio (SINR) per OFDM tone in the operating channel of the device 115-c. Alternatively, the device 115-c may measure interference power per tone. Measurement may be triggered or initiated when the device 115-c has poor performance, for example, has a relatively high or unexpected packet error rate (PER), relatively low throughput, relatively high or unexpected packet delay, and/or relatively high medium usage (e.g., due to un-decodable interference). The wireless device 115-c may determine whether to perform such measurement using such factors, as appropriate or desired, or may perform such measurements upon receiving a request to do so from the AP 105-a with the AP 105-a making the determination based at least in part on the performance of the device 115-c, which may be reported to the AP 105-a by the device 115-c.

If the SINR falls below a threshold for some edge tones but not for central tones, ACI may be detected. Alternatively, ACI may be detected if the interference power per tone exceeds a threshold for some edge tones but not for central tones. In either case, such detection of interference in the base station/AP operating (serving) channel may be referred to as "in-band detection" of interference. The central tones may be defined by the device 115-c, the AP 105-a, or the network (e.g., the network configuration server). As with the performance of the device 115-c, the measurements may be reported to the AP 105-a with the AP 105-a making the determination/detection of ACI based at least in part on the measurements. Because the measurements are made per tone, the device 115-c or the AP 105-a may determine which side of the bandwidth of the operating channel ACI exists when ACI is detected on only one side.

Another approach for detecting ACI channel interference may involve the wireless device 115-c tuning to non-operating channels to identify one or more channels as ACI channels causing or contributing to the ACI. The wireless device 115-c may tune to non-operating channels and measure the received signal strength indicator (RSSI) for each non-operating channel. Measurement may be triggered when the device 115-c has poor performance or when the AP requests measurement based on the performance of the device 115-c, as discussed above, or when in-band detection of ACI occurs. When in-band detection of ACI is performed by the device 115-c before tuning to the non-operating channels for measurement, the device 115-c or the AP 105-a may determine that ACI exists on only, or predominantly, one side of the bandwidth of the operating channel. In such case, the wireless device 115-c may tune only to non-operating channels on that same side for measurement, thus saving time and effort to identify the ACI channel(s).

If the measured RSSI for a non-operating channel exceeds threshold, the non-operating channel may be identified as an ACI channel (i.e., a channel causing or contributing to the ACI). In some embodiments, the threshold may be a variable threshold, for example, and the threshold may be set higher for channels further away from the operating channel. Such an approach may help account for lower relative ACI leakage for such channels as the channels are further away, and the variable threshold may be based on the expected ACI leakage ratio for each non-operating channel.

Another approach for detecting ACI channel interference may involve the wireless device 115-c and/or the AP 105-a serving the device 115-c communicating with other devices 115 and/or APs over a common control channel. The common control channel may be agreed to in any suitable manner (e.g., negotiated, predetermined, etc.). Messages may be transmitted and received over the common control channel to provide information regarding other devices to the wireless device 115-c and/or AP 105-a. The information may include, for example, the presence of the device(s), the associated AP(s), the respective transmit power(s) and the respective operating channel(s).

When the device 115-c has poor performance, the device 115-c and/or the serving AP 105-a may identify one or more ACI channels as described above. However, such identification may be performed in a more efficient manner by limiting the non-operating channels to be tuned to and measured, for example, using the information contained in the messages received over the common control channel. Further, the tuning and measuring may be limited to channels of other wireless devices based on the respective signal strengths of the messages from the other devices. If ACI is detected for a non-operating channel, the wireless device 115-c or the AP 105-a may determine the identity of the interfering device, the associated AP and the ACI channel number. The wireless device 115-c and the AP 105-a may share this information with the other to perform interference mitigation as described herein (other than using a partial channel bandwidth of the operating channel because the information in the messages may be insufficient for that mitigation approach).

Alternatively or additionally, the common control channel approach may allow a device and/or an AP to proactively mitigate anticipated ACI. For example, based on the messages and their relative strengths on the common control channel, the device or AP may determine that relatively strong APs and/or devices are operating on adjacent channels. In response to that determination, even though no ACI may yet be experienced for a device, the device and/or the AP may employ one or more of the mitigation approaches discussed herein (other than using a partial channel bandwidth of the operating channel).

In some embodiments, inter-AP or inter-device coordination or negotiation may be performed over the common control channel to mitigate the detected ACI, as indicated by the communication links 145 and 150 in FIG. 1.

In general, the device 115-*c* may detect non-Wi-Fi interference when the device 115-*c* has poor performance but does not detect relatively strong Wi-Fi interference (such as ACI) on its operating channel and nearby channels. For example, the device 115-*c* (and its AP 105-*a*) may perform Wi-Fi interference detection and may not find any that is causing poor performance of the device 115-*c*. Alternatively, the device 115-*c* may find Wi-Fi interference and mitigate such Wi-Fi interference without sufficiently improving the performance of the device 115-*c*. In either case, non-Wi-Fi interference may be considered to exist and cause the poor performance.

Once ACI and/or non-Wi-Fi interference is detected, the device 115-*c* and/or the AP 105-*a* may mitigate the interference. Additional features and/or aspects of the foregoing mechanisms to detect Wi-Fi and non-Wi-Fi interference and various approaches for mitigating Wi-Fi and non-Wi-Fi interference are provided below with respect to FIGS. 2-8.

Figure 2A:
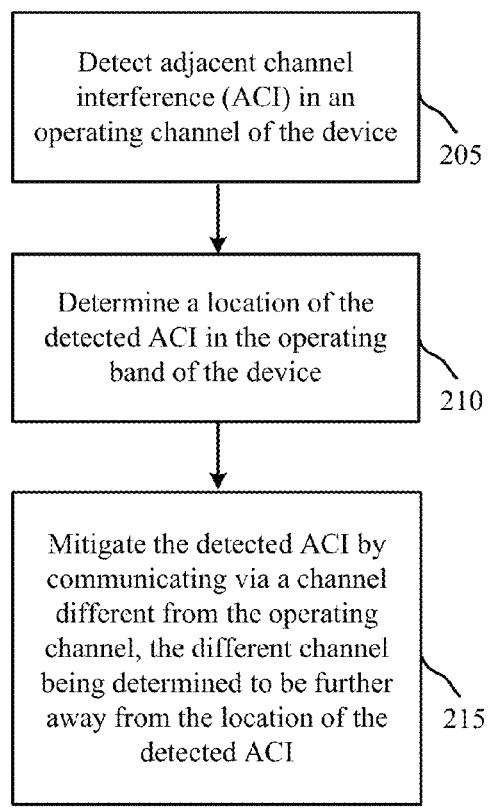
FIG. 2A shows an example of a flowchart illustrating a method that may be used to mitigate interference.

FIG. 2A is a flowchart illustrating an example of a method 200-*a* that may be used to mitigate Wi-Fi interference, such as ACI. For clarity, the method 200-*a* is described below with reference to one of the wireless devices and/or APs shown in FIG. 1. In one embodiment, one of the wireless devices and/or its serving AP may execute one or more sets of codes to control the functional elements of the device and/or its serving AP to perform the functions described below.

At block 205, adjacent channel interference (ACI) produced at a first device (e.g., wireless device 115-*c*) by a second device (e.g., wireless device 115-*d*) is detected in an operating channel of the first device. The first device and the second device are configured to wirelessly communicate with a respective associated access point (e.g., AP 105-*a* and AP 105-*b*) using an open band (e.g., Wi-Fi band). As discussed above, concurrent communications by the first and second devices may cause ACI in the operating channel of the first device. The detection may be based, at least in part, on the performance of the first device as discussed above.

Next at block 210, a location of the detected ACI in the operating band of the first device may be determined This may be performed by in-band detection as described above, for example. Once the location of the detected ACI is determined, the first device may mitigate the ACI by communicating via a channel different from the operating channel, at block 215.

Figure 2B:
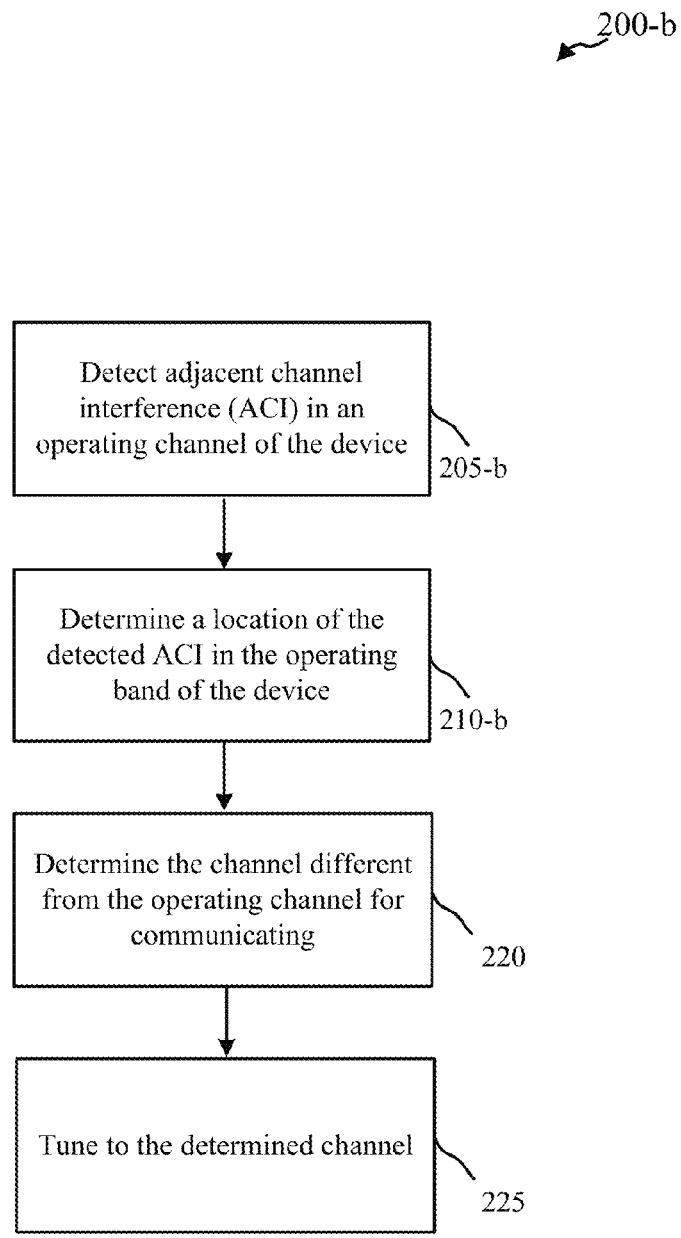
FIG. 2B shows an example of a flowchart illustrating another method that may be used to mitigate interference.

FIG. 2B is a flowchart illustrating another example of a method 200-*b* that may be used to mitigate Wi-Fi interference, such as ACI. For clarity, the method 200-*b* is described below with reference to one of the wireless devices and/or APs shown in FIG. 1. Again, one of the wireless devices and/or its serving AP may execute one or more sets of codes to control the functional elements of the device and/or its serving AP to perform the functions described below.

At block 205-*b*, ACI may be detected in the operating channel of the device, such as described above with respect to block 205 of FIG. 2A. Next at block 210-*b*, a location of the detected ACI in the operating band of the device may be determined, such as described above with respect to block 210 of FIG. 2A. Once the location of the detected ACI is determined, a channel different from the operating channel for communicating may be determined at block 220. Then at block 225, the device may tune to the determined channel. In this manner, the device suffering from the ACI may mitigate the ACI by communicating via a channel different from the operating channel, such as at block 215 of FIG. 2A.

The suffering device and/or the AP serving the suffering device may change the channel on which the AP serves the suffering device. For example, the AP may move the suffering device to a clean channel that is further away from the location of the detected ACI. As such, the suffering device or its AP may determine the channel for communicating based on its lack of interference and/or its location. For example, the suffering device may mitigate the ACI by moving itself (i.e., tuning) to a different channel that is further away. In one embodiment, the suffering device may switch to another AP (when available and in range) that is operating on a clean channel that is further away from the location of the detected ACI.

Figure 2C:
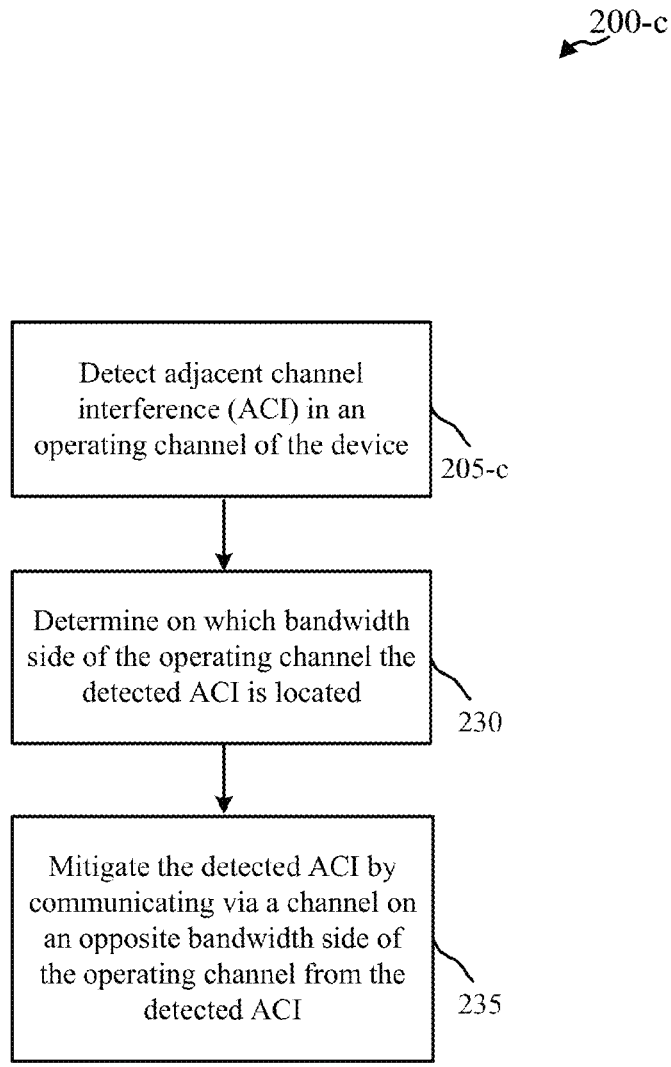
FIG. 2C shows an example of a flowchart illustrating another method that may be used to mitigate interference.

FIG. 2C is a flowchart illustrating another example of a method 200-*c* that may be used to mitigate Wi-Fi interference, such as ACI. For clarity, the method 200-*c* is described below with reference to one of the wireless devices and/or APs shown in FIG. 1. Again, one of the wireless devices and/or its serving AP may execute one or more sets of codes to control the functional elements of the device and/or its serving AP to perform the functions described below.

At block 205-*c*, ACI may be detected in the operating channel of the device, such as described above with respect to block 205 of FIG. 2A. Next at block 230, a side of the bandwidth of the operating channel on which the detected ACI is located, or predominantly located, may be determined Once the side of the operating channel bandwidth with the ACI is determined, the suffering device may mitigate the detected ACI by communicating via a channel on the opposite side of the operating channel bandwidth from the detected ACI at block 235. For example, when in-band detection determines that the ACI is only, or predominantly, from one side of the operating bandwidth of the suffering device, the AP may move the suffering device to a clean channel on the other side of the operating bandwidth.

Figure 2D:
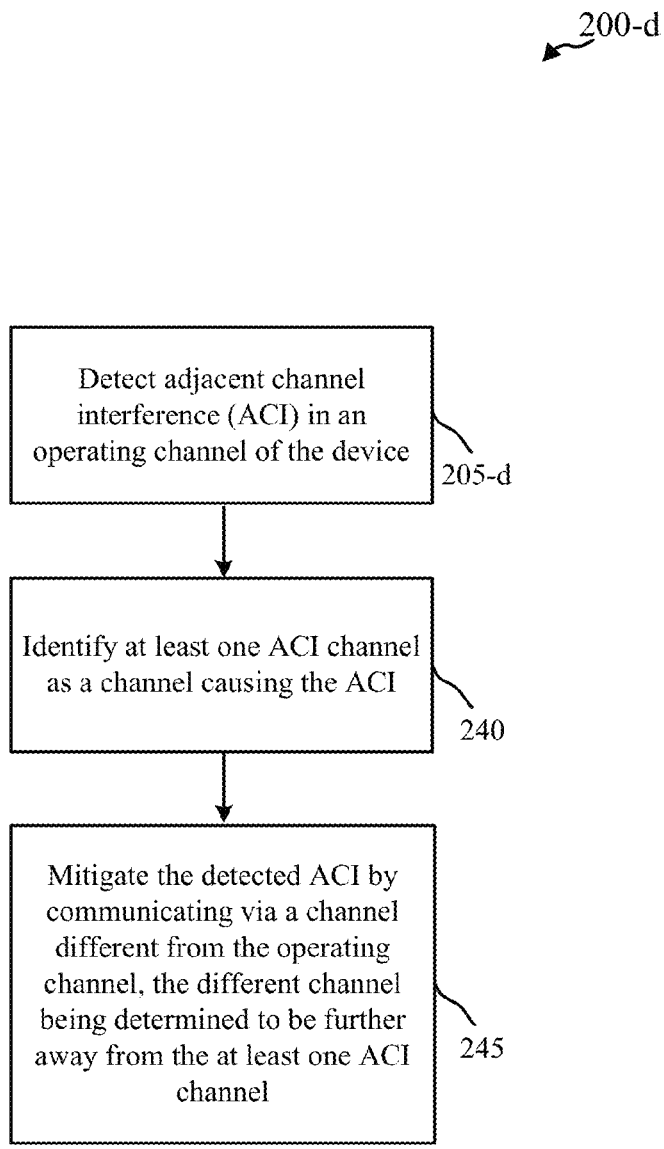
FIG. 2D shows an example of a flowchart illustrating another method that may be used to mitigate interference.

FIG. 2D is a flowchart illustrating another example of a method 200-*d* that may be used to mitigate Wi-Fi interference, such as ACI. For clarity, the method 200-*d* is described below with reference to one of the wireless devices and/or APs shown in FIG. 1. Again, one of the wireless devices and/or its serving AP may execute one or more sets of codes to control the functional elements of the device and/or its serving AP to perform the functions described below.

At block 205-*c*, ACI may be detected in the operating channel of the device, such as described above with respect to block 205 of FIG. 2A. Next at block 240, one or more ACI channels may be identified as an ACI channel, i.e., as a channel causing or contributing to the ACI. The ACI channel(s) may be identified, for example, using the approach for detecting ACI channel interference in which the suffering device tunes to non-operating channels to identify one or more channels as ACI channels causing the ACI, as described above with respect to FIG. 1. Alternatively, one or more non-operating channels may be identified as ACI channels using information included in messages received over a common control channel, also as described above with respect to FIG. 1.

After identification of the ACI channel(s), the suffering device may mitigate the ACI by communicating via a channel different from the operating channel, at block 215. The different channel for communicating may be determined to be further away from the identified ACI channel(s), further away from a majority of the identified ACI channels, or further away from the identified ACI channel(s) contributing the most to the detected ACI. The AP and/or the suffering device may move the suffering device to the different channel.

Figure 2E:
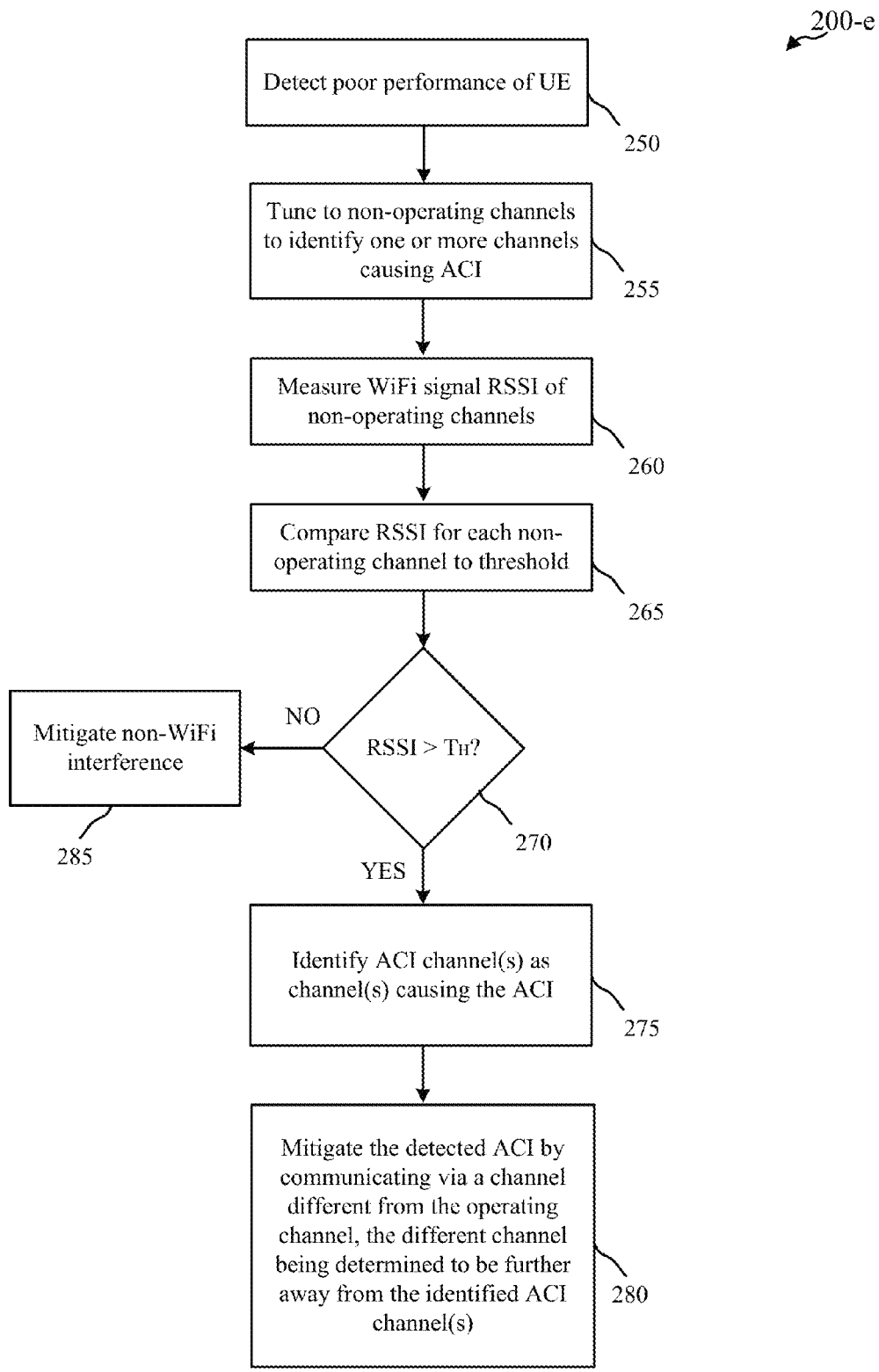
FIG. 2E shows an example of a flowchart illustrating a method that may be used to mitigate ACI, non-Wi-Fi interference, or both.

FIG. 2E is a flowchart illustrating another example of a method 200-*e* that may be used to mitigate Wi-Fi interference, such as ACI. For clarity, the method 200-e is described below with reference to one of the wireless devices and/or APs shown in FIG. 1. Again, one of the wireless devices and/or its serving AP may execute one or more sets of codes to control the functional elements of the device and/or its serving AP to perform the functions described below.

At block 250, poor performance of the wireless device or user equipment (UE) may be detected. As described above with respect to FIG. 1, the UE or the AP serving the UE may initiate ACI detection in response to detection of poor performance of the UE. Thus, at block 255, the suffering UE may begin detecting ACI by tuning to non-operating channels to identify one or more channels causing the ACI. Next at block 260, the suffering UE may measure the RSSI for each of the non-operating channels tuned to. Then at block 265, the RSSI for each of the non-operating channels may be compared to a threshold.

At block 270, a determination may be made based on the comparison. If the RSSI of at least one of the non-operating channels tuned to exceeds the threshold, the process may continue to block 275 where the at least one of the non-operating channels is identified as an ACI channel, i.e., a channel causing or contributing to the detected ACI. Then at block 280, the suffering UE may mitigate the ACI by communicating via a channel different from the operating channel. As above, the different channel for communicating may be determined to be further away from the identified ACI channel(s), and the AP and/or the suffering UE may move the suffering device to the different channel.

If the RSSI of none of the non-operating channels tuned to exceeds the threshold, then the suffering UE may be considered to be suffering from non-Wi-Fi interference. Thus, the process may jump to block 285 where mitigation of non-Wi-Fi interference may be performed. Such mitigation of non-Wi-Fi interference may be performed in any suitable manner, and may be performed using the approaches described below with respect to FIGS. 6A, 6B and/or 6C.

Although the tuning, measuring, comparing, identifying and ACI mitigating operations are illustrated and described sequentially for all non-operating channels being dealt with as potential sources of interference, it should be understood that these operations may be performed in any suitable loop or loops. For example, the suffering UE may tune to a non-operating channel, measure the RSSI, obtain a comparison of the RSSI to the threshold and obtain a determination as to whether that non-operating channel is an ACI channel. If so, the ACI may be mitigated with respect to that ACI channel, and the method may restart upon detecting poor performance, whether continued or new.

If that non-operating channel is not an ACI channel, the previous operations (tuning, measuring, comparing, etc.) may be repeated for a next non-operating channel and so on until a non-operating channel is identified as an ACI channel. A suitable number of repetitions, e.g., the number of non-operating channels dealt with as potential sources of interference, may be performed before the loop is discontinued. The number of repetitions/candidate ACI channels may be determined, for example, so that leaked ACI is negligible as compared to thermal noise (e.g., less than 3 decibels or so) by assuming a relatively high RSSI on an ACI channel (e.g., −40 dBm (dBmW)). The method may involve searching +/−N candidate channels around the operating channel. Candidate channels closer to operating channel may be searched earlier in the process, and the loop may be discontinued once a sufficient number of ACI channels has been identified (e.g., 3 or more). If the loop is discontinued without proceeding to blocks 275 and 280 for any of the non-operating channels searched, then the suffering UE may be considered to be suffering from non-Wi-Fi interference, and the process may jump to block 285 for mitigation of non-Wi-Fi interference.

The methods illustrated in FIGS. 2A, 2B, 2C, 2D and 2E and described above are related such that various aspects thereof may be combined to obtain other methods not specifically illustrated. Not all permutations are illustrated for the sake of clarity and brevity. However, those skilled in the art will readily appreciate other methods involving the operations depicted and described are possible based on this description. Further, it should be understood that not all operations may necessarily be performed to carry out an effective method of interference mitigation.

Figure 3A:
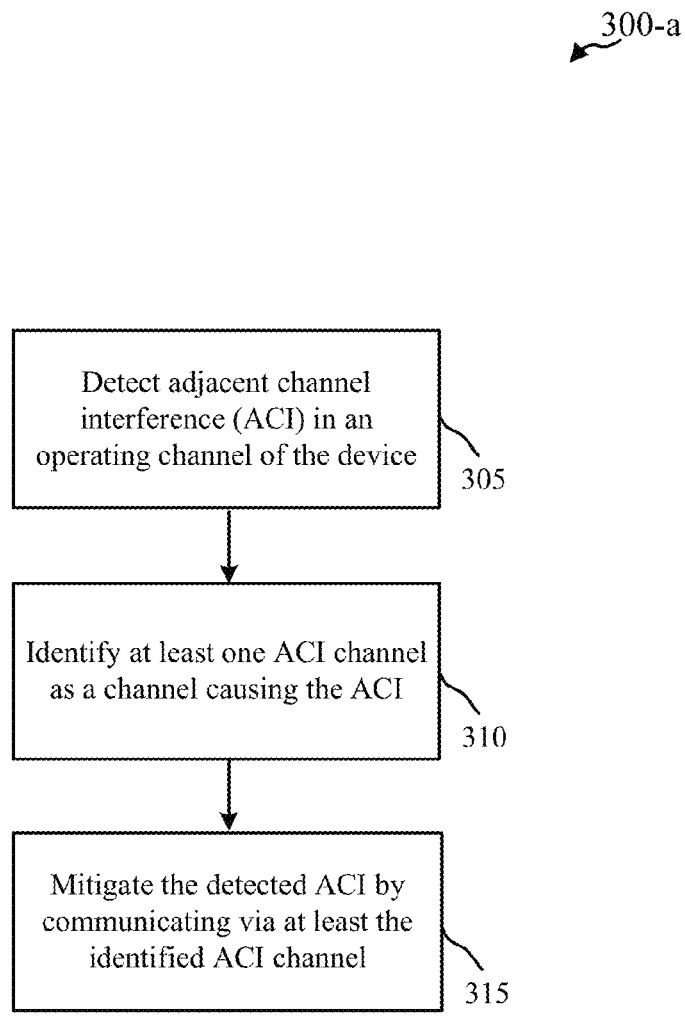
FIG. 3A shows an example of a flowchart illustrating another method that may be used to mitigate interference.

FIG. 3A is a flowchart illustrating an example of a method 300-a that may be used to mitigate Wi-Fi interference, such as ACI. For clarity, the method 300-a is described below with reference to one of the wireless devices and/or APs shown in FIG. 1. In one embodiment, one of the wireless devices and/or its serving AP may execute one or more sets of codes to control the functional elements of the device and/or its serving AP to perform the functions described below.

At block 305, adjacent channel interference (ACI) produced at a first device (e.g., wireless device 115-c) by a second device (e.g., wireless device 115-d) is detected in an operating channel of the first device. The first device and the second device are configured to wirelessly communicate with a respective associated access point (e.g., AP 105-a and AP 105-b) using an open band (e.g., Wi-Fi band). As discussed above, concurrent communications by the first and second devices may cause ACI in the operating channel of the first device. The detection may be based, at least in part, on the performance of the first device as discussed above.

Next at block 310, one or more non-operating channels may be identified as an ACI channel, i.e., as a channel causing or contributing to the ACI. The ACI channel(s) may be identified, for example, using the approach for detecting ACI channel interference in which the suffering device tunes to non-operating channels to identify one or more channels as ACI channels causing the ACI, as described above with respect to FIG. 1. Alternatively, one or more non-operating channels may be identified as ACI channels using information included in messages received over a common control channel, also as described above with respect to FIG. 1.

After identification of the ACI channel(s), the suffering device or the AP serving the suffering device may mitigate the ACI by communicating with each other via at least an identified ACI channel. If more than one non-operating channel is identified as an ACI channel, the ACI channel to use for communicating may be determined in any suitable manner. For example, the suffering device may be configured to tune to the identified ACI channel that contributes the most to the detected ACI. Alternatively or additionally, the suffering device may tune to the identified ACI channel that is furthest from other identified ACI channels. Further, alternatively or additionally, the suffering device may tune to the identified ACI channel that has a least measured total load as compared to the other identified ACI channels. Alternatively or additionally, the AP may be configured to switch communications with the suffering device and all other devices (or devices identified using the information included in messages received over a common control channel, such as only interfering devices) to the identified ACI channel. With the suffering device and the interfering device(s) communicating on a same channel, conventional deferring approaches (e.g., carrier sensing, request-to-send/clear-to-send (RTS/CTS)) may be employed to mitigate or avoid the ACI.

Figure 3B:
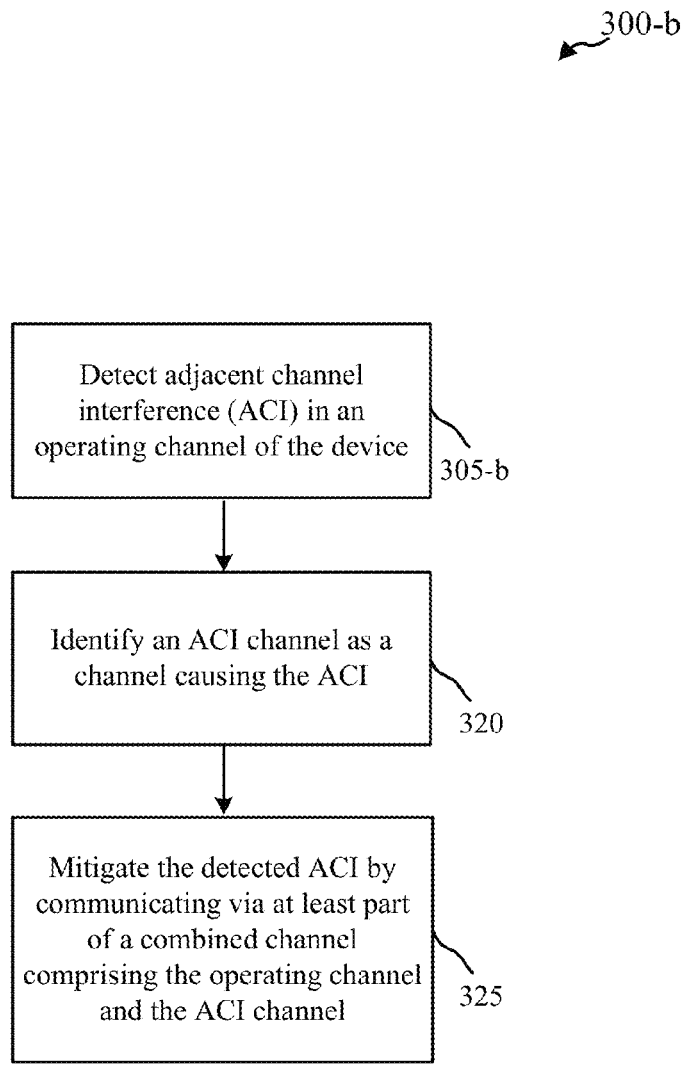
FIG. 3B shows an example of a flowchart illustrating another method that may be used to mitigate interference.

FIG. 3B is a flowchart illustrating an example of a method 300-*b* that may be used to mitigate Wi-Fi interference, such as ACI. For clarity, the method 300-*b* is described below with reference to one of the wireless devices and/or APs shown in FIG. 1. In one embodiment, one of the wireless devices and/or its serving AP may execute one or more sets of codes to control the functional elements of the device and/or its serving AP to perform the functions described below.

At block 305-*b*, ACI may be detected in the operating channel of the device, such as described above with respect to block 305 of FIG. 3A. Next at block 320, an operating channel may be identified as an ACI channel, i.e., as a channel causing or contributing to the ACI. The ACI channel may be identified, for example, using the approach for detecting ACI channel interference in which the suffering device tunes to non-operating channels to identify one or more channels as ACI channels causing the ACI, as described above with respect to FIG. 1. Alternatively, one or more non-operating channels may be identified as ACI channels using information included in messages received over a common control channel, also as described above with respect to FIG. 1. If multiple ACI channels are identified, one of the identified ACI channels may be selected as the ACI channel to be used. For example, the identified ACI channel that contributes the most to the ACI, that is furthest from the other identified ACI channels, and/or that has a least measured total load may be selected. Alternatively, if multiple ACI channels are identified, the operating channel may be combined with two or more of the identified ACI channels, which may be selected as appropriate or desired.

After the ACI channel (or channels) is identified/selected, the suffering device or the AP serving the suffering device may mitigate the ACI by communicating with each other via at least part of a combined operating channel including the original suffering operating channel and the ACI channel(s). The serving AP may extend its operating channel by combining the original operating channel with the identified ACI channel(s). The AP may then serve the suffering device on the extended operating channel (operating channel plus ACI channel(s)), or may serve the suffering device only on the identified ACI channel. Conventional deferring (e.g., carrier sensing, RTS/CTS) may be employed at least on the identified ACI channel to mitigate or avoid the ACI. The AP may also receive probe requests from new devices and transmit probe responses to new devices on the original operating channel of the non-suffering devices. Thus in some embodiments, the original operating channel may still serve as the primary channel for probe request/response, transmit/receive beacons, etc.

The methods illustrated in FIGS. 3A and 3B and described above are related such that various aspects thereof may be combined to obtain other methods not specifically illustrated. Not all permutations are illustrated for the sake of clarity and brevity. However, those skilled in the art will readily appreciate other methods involving the operations depicted and described are possible based on this description.

Figure 4A:
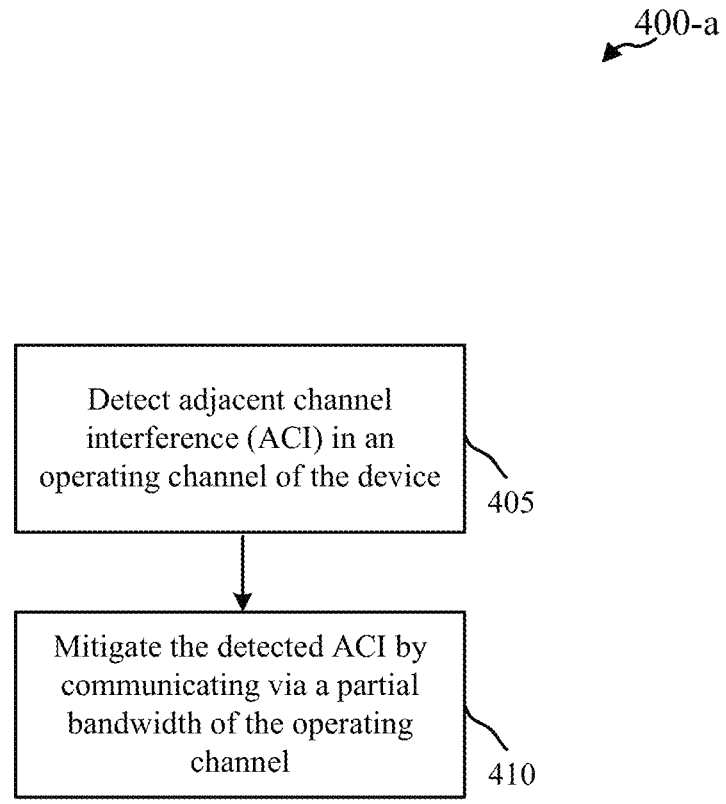
FIG. 4A shows an example of a flowchart illustrating another method that may be used to mitigate interference.

FIG. 4A is a flowchart illustrating an example of a method 400-*a* that may be used to mitigate Wi-Fi interference, such as ACI. For clarity, the method 400-*a* is described below with reference to one of the wireless devices and/or APs shown in FIG. 1. In one embodiment, one of the wireless devices and/or its serving AP may execute one or more sets of codes to control the functional elements of the device and/or its serving AP to perform the functions described below.

At block 405, adjacent channel interference (ACI) produced at a first device (e.g., wireless device 115-*c*) by a second device (e.g., wireless device 115-*d*) is detected in an operating channel of the first device. The first device and the second device are configured to wirelessly communicate with a respective associated access point (e.g., AP 105-*a* and AP 105-*b*) using an open band (e.g., Wi-Fi band). As discussed above, concurrent communications by the first and second devices may cause ACI in the operating channel of the first device. The detection may be based, at least in part, on the performance of the first device as discussed above.

Next at block 410, the suffering device or the AP serving the suffering device may mitigate the ACI by communicating with each other via a partial bandwidth of the operating channel of the suffering device. The partial bandwidth may exclude one or more tones of the original operating channel, thus providing a reduced bandwidth as compared to the original operating channel. The excluded tones may be tones that suffer from ACI so that the partial bandwidth is free, or freer, of ACI.

Figure 4B:
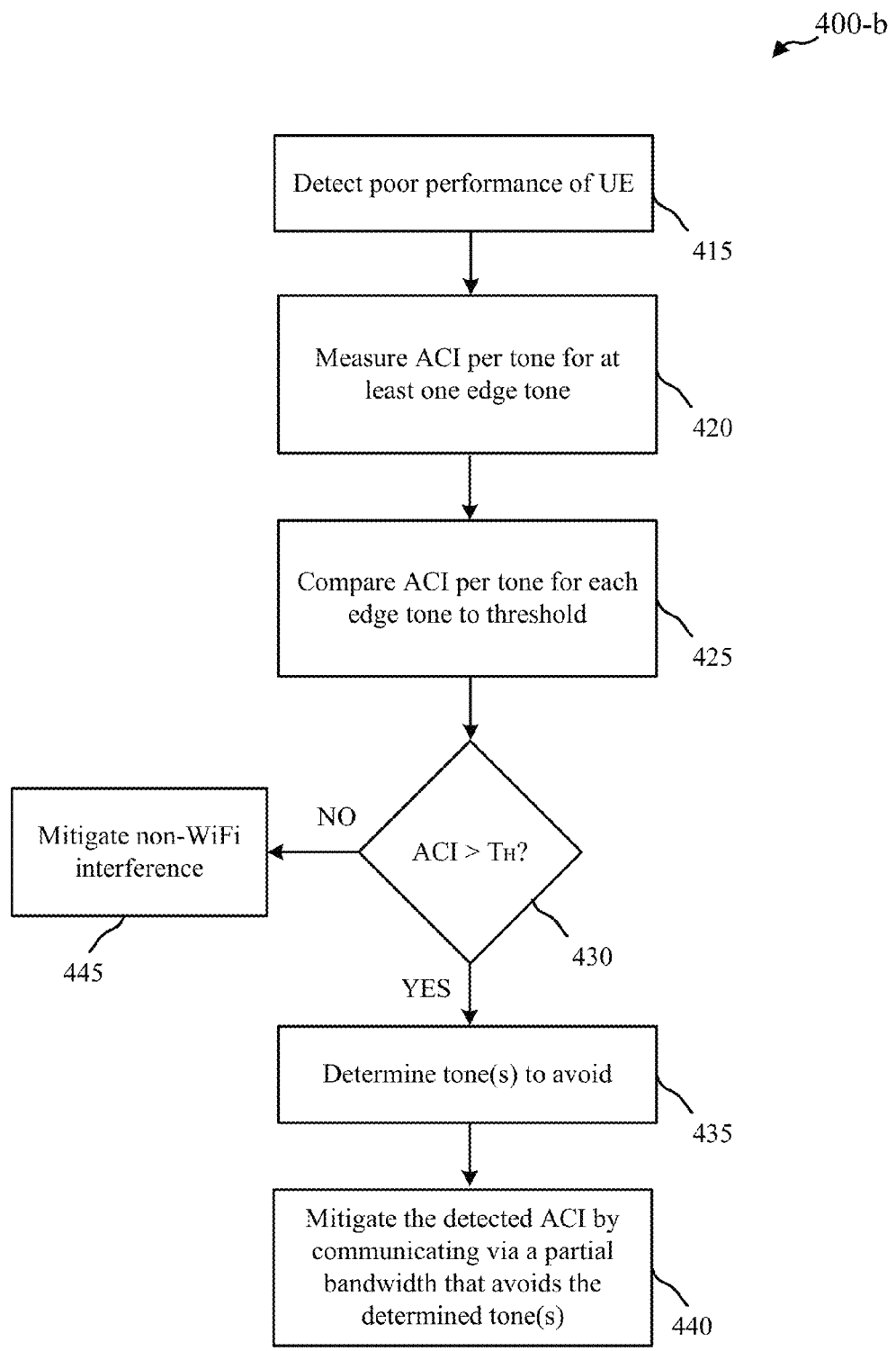
FIG. 4B shows an example of a flowchart illustrating another method that may be used to mitigate ACI, non-Wi-Fi interference, or both.

FIG. 4B is a flowchart illustrating an example of a method 400-*b* that may be used to mitigate Wi-Fi interference, such as ACI. For clarity, the method 400-*b* is described below with reference to one of the wireless devices and/or APs shown in FIG. 1. In one embodiment, one of the wireless devices and/or its serving AP may execute one or more sets of codes to control the functional elements of the device and/or its serving AP to perform the functions described below.

At block 415, poor performance of the wireless device or user equipment (UE) may be detected. As described above with respect to FIG. 1, the UE or the AP serving the UE may initiate ACI detection in response to detection of poor performance of the UE. Thus, at block 420, the suffering UE may begin detecting ACI by measuring ACI per tone of at least one edge tone. The ACI may be measured in tern of interference power per edge tone and/or SINR per edge tone. Then at block 425, the ACI per tone for each edge tone may be compared to a threshold.

At block 430, a determination may be made based on the comparison. For example, if the interference power for an edge tone exceeds a threshold ($T_H$), the method may continue to block 435, where that edge tone may be determined as a tone to avoid, e.g., a tone that is suffering from ACI. Alternatively but not illustrated in block 430, if the SINR for an edge tone is less than corresponding threshold, the method may continue to block 435, where that edge tone may be determined as a tone to avoid. Then at block 440, the suffering UE may mitigate the ACI by communicating via a partial bandwidth that avoids the determined tone(s). The suffering UE may report suffering edge tones to the AP and the AP may decide to avoid using the suffering tones in the future, resulting in a partial bandwidth being used. Further, the AP may reconfigure the operating channel with a smaller bandwidth to exclude the suffering tones. For example, when operating according to Wi-Fi standard 802.11ah, the operating channel bandwidth may be reduced from 16 MHz to 8, 4 or 2MHz as needed to sufficiently mitigate the ACI. The AP may inform the suffering UE of the tones to continue to use or the new operating channel configuration to use. The suffering UE may update the suffering tones when the operations of block 415 through block 435 are performed again, for example, if the UE has further poor performance (e.g., suffers from further ACI), which may result from changes in the tones that suffer from ACI.

If the interference power of none of edge tones exceeds the threshold, then the UE may be considered to be suffering from non-Wi-Fi interference. Thus, the process may jump to block 445 where mitigation of non-Wi-Fi interference may be performed. Such mitigation of non-Wi-Fi interference may be performed in any suitable manner, and may be performed using the approaches described below with respect to FIGS. 6A, 6B and/or 6C.

Although the measuring, comparing, determining and ACI mitigating operations are illustrated and described sequentially for all edge tones being dealt with as potentially suffering from interference, it should be understood that these operations may be performed in any suitable loop or loops. For example, the suffering UE may measure the ACI for one edge tone, obtain a comparison of the measured ACI to the threshold and obtain a determination as to whether that edge tone is a tone to avoid. If so, the ACI may be mitigated with respect to that edge tone by avoiding or excluding that edge tone for future use. The method may then restart upon detecting poor performance, whether continued or new.

If that edge tone is not a tone to be avoided (e.g., is not suffering sufficiently from ACI), the previous operations (measuring, comparing, etc.) may be repeated for a next edge tone and so on until an edge tone is determined as a tone to be avoided. A suitable number of repetitions, e.g., the number of edge tones dealt with as potentially suffering from ACI, may be performed before the loop is discontinued. The number of repetitions or edge tones may be determined, for example, by limiting the edge tones investigated to those with a SINR below a certain threshold. If the loop is discontinued without proceeding to blocks 435 and 440 for any of the edge tones of the operating channel, then the suffering UE may be considered to be suffering from non-Wi-Fi interference, and the process may jump to block 445 for mitigation of non-Wi-Fi interference.

In some alternative embodiments, the suffering UE or the serving AP may decide or otherwise determine which edge tones are suffering based on an estimated improvement in the transmission rate supported by the operating channel. This may be performed, for example, instead of the operations in blocks 425, 430 and 435 as described above. The edge tone with the worst interference power (or worst SINR) may be removed from the operating channel to obtain a partial bandwidth for communicating via the operating channel. The transmission rate supported by the partial bandwidth operating channel may then be checked to determine if the supported rate has been increased. If so, the edge tone with the next worst interference power (or worst SINR) may be removed from the operating channel to obtain an updated partial bandwidth for communicating via the operating channel. The transmission rate supported by the updated partial bandwidth operating channel may then be checked to determine if the supported rate has been increased again. Edge tones may thus be removed until the supported rate no longer is increased, or until the increase in the supported rate is negligible or less than a desired threshold.

The methods illustrated in FIGS. 4A and 4B and described above are related such that various aspects thereof may be combined to obtain other methods not specifically illustrated. Not all permutations are illustrated for the sake of clarity and brevity. However, those skilled in the art will readily appreciate other methods involving the operations depicted and described are possible based on this description. Further, it should be understood that not all operations may necessarily be performed to carry out an effective method of interference mitigation.

Figure 5A:
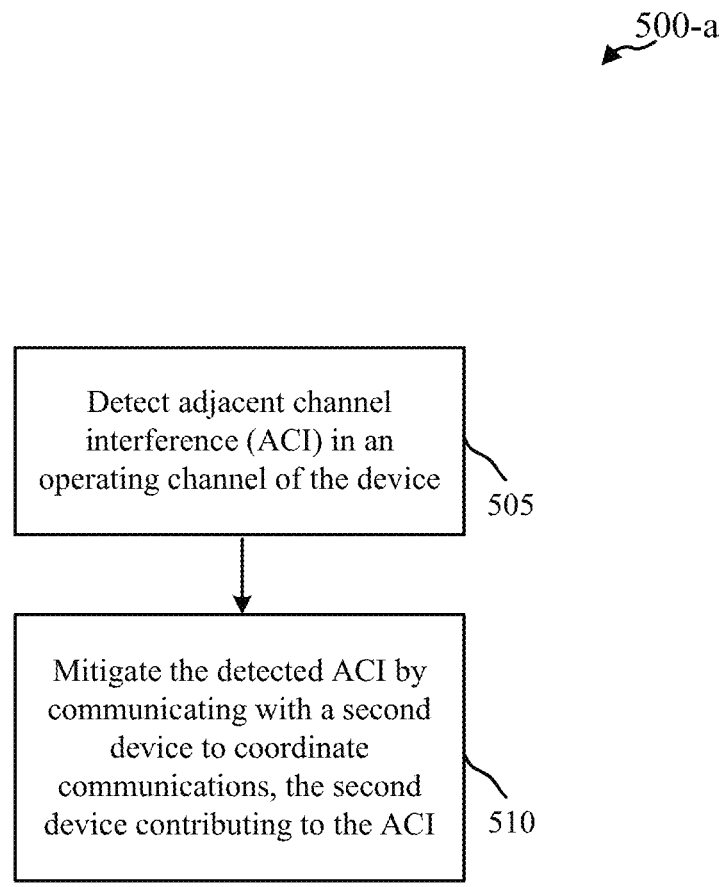
FIG. 5A shows an example of a flowchart illustrating another method that may be used to mitigate interference.

FIG. 5A is a flowchart illustrating an example of a method 500-a that may be used to mitigate Wi-Fi interference, such as ACI. For clarity, the method 500-a is described below with reference to one of the wireless devices and/or APs shown in FIG. 1. In one embodiment, one of the wireless devices and/or its serving AP may execute one or more sets of codes to control the functional elements of the device and/or its serving AP to perform the functions described below.

At block 505, adjacent channel interference (ACI) produced at a first device (e.g., wireless device 115-c) by a second device (e.g., wireless device 115-d) is detected in an operating channel of the first device. The first device and the second device are configured to wirelessly communicate with a respective associated access point (e.g., AP 105-a and AP 105-b) using an open band (e.g., Wi-Fi band). As discussed above, concurrent communications by the first and second devices may cause ACI in the operating channel of the first device. The detection may be based, at least in part, on the performance of the first device as discussed above.

Next at block 510, the suffering device or the AP serving the suffering device may mitigate the ACI by communicating with the second device to coordinate communications for the suffering device and the second device. The second device may be identified as an interfering device in any suitable manner. For example, the second device may be determined to be an interfering device using information included in messages sent over a common control channel as described above. This approach may be extended for multiple interfering devices so that communications for the suffering device and the interfering devices may be coordinated.

In some embodiments, the coordination of communications may be implemented via AP-to-AP (inter-AP) communications to mitigate the ACI. For such inter-AP interference coordination, the suffering device may report the interfering device(s) and respective serving AP to its own serving AP. The suffering device's serving AP may negotiate with the AP(s) of the interfering device(s) to coordinate communications and reduce or avoid ACI. In some embodiments, the suffering device's AP may directly communicate and negotiate with the interfering device(s), if the respective interfering device(s) are within range of the suffering device's AP.

In some embodiments, the suffering device and the interfering device(s) may continue to communicate with their respective serving APs using their original operating channels but in orthogonal time slots as determined by the interference coordination. If at some time the ACI ceases to exist (or decreases to below a desired threshold) in the time slot of an interfering device, the suffering device may discontinue orthogonal time slot operation with respect to that time slot/interfering device.

Alternatively, either the suffering device and/or one or more interfering devices may be moved by the AP of the respective device to a new channel that does not result in ACI (e.g., suffering or causing ACI). The suffering device and/or the interfering device(s) may indicate a preference to move to its respective AP. For example, a device may indicate a lower preference to move (or a preference not to move) if the device has real-time applications running As yet another alternative, the suffering device and the interfering device(s) may be switched to a same AP for service. This AP may or may not be one of the original serving APs for the suffering device or the interfering device(s). In some embodiments, the AP switched to may provide good coverage (e.g., good signal strength, etc.) for the suffering device and the interfering device(s). Otherwise, device(s) that are further away from the AP switched to may use a closer AP as a relay to communicate with the AP.

Figure 5B:
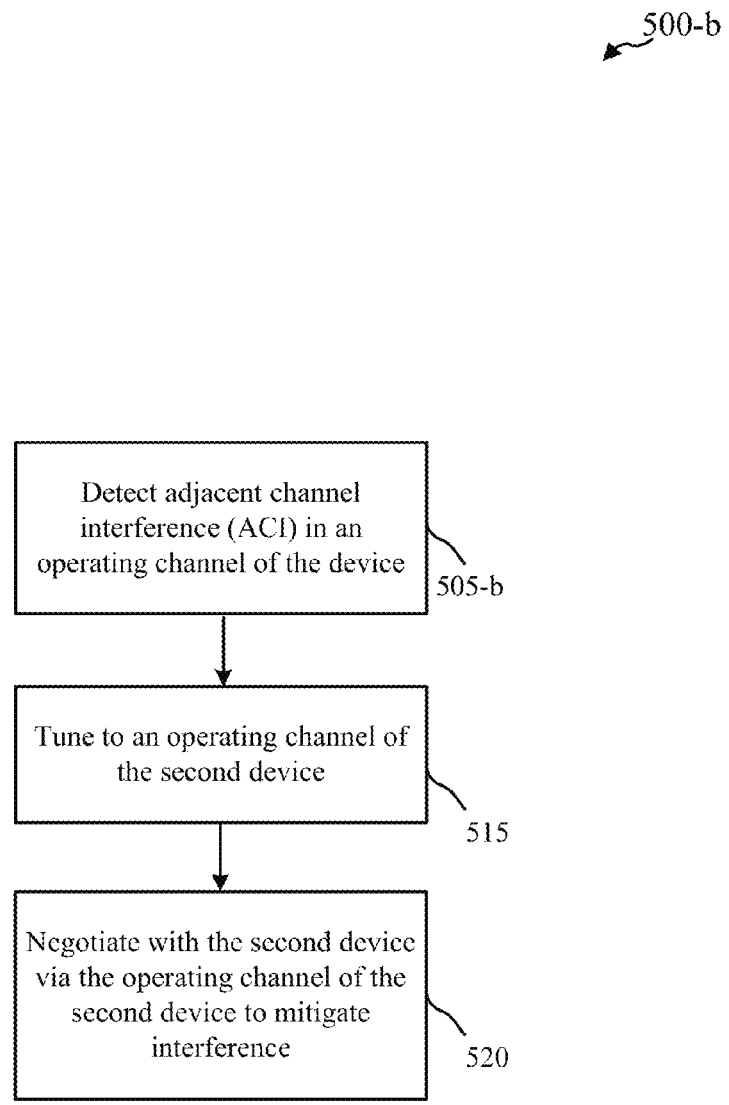
FIG. 5B shows an example of a flowchart illustrating another method that may be used to mitigate interference.

FIG. 5B is a flowchart illustrating an example of a method 500-b that may be used to mitigate Wi-Fi interference, such as ACI. For clarity, the method 500-b is described below with reference to one of the wireless devices and/or APs shown in FIG. 1. In one embodiment, one of the wireless devices and/or its serving AP may execute one or more sets of codes to control the functional elements of the device and/or its serving AP to perform the functions described below.

At block 505-*b*, ACI may be detected in the operating channel of the device, such as described above with respect to block 505 of FIG. 5A. Next at block 515, the suffering device may tune to the ACI channel(s) (identified as described above, for example). Then at block 520, the suffering device may negotiate with the interfering device(s) to coordinate communications and reduce or avoid ACI. This coordination of communications may be implemented via device-to-device (D2D) communications to mitigate the ACI.

In some embodiments, the suffering device and the interfering device(s) may continue to communicate with their respective serving APs using their original operating channels but in orthogonal time slots. This may eliminate any need for the suffering station to tune to the ACI channel(s) for sending deferring communications (e.g., RTS/CTS) thereon. As described above with respect to FIG. 5A, the suffering device may discontinue orthogonal time slot operation with respect to a time slot/interfering device if the ACI ceases/decreases in the time slot of the interfering device.

Alternatively, either the suffering device and/or one or more interfering devices may request or require its respective AP to move the respective device to a new channel that does not result in ACI (e.g., suffering or causing ACI). As described above with respect to FIG. 5A, the suffering device and/or the interfering device(s) may indicate a preference to move.

As yet another alternative, the suffering device and the interfering device(s) may switch to a same AP for service. As described above with respect to FIG. 5A, this AP may or may not be one of the original serving APs. Further, the AP switched to may provide good coverage for the suffering device and the interfering device(s). Otherwise, device(s) that are further away from the AP switched to may use a closer AP as a relay to communicate with the AP.

The methods illustrated in FIGS. 5A and 5B and described above are related such that various aspects thereof may be combined to obtain other methods not specifically illustrated. Not all permutations are illustrated for the sake of clarity and brevity. However, those skilled in the art will readily appreciate other methods involving the operations depicted and described are possible based on this description.

Figure 6A:
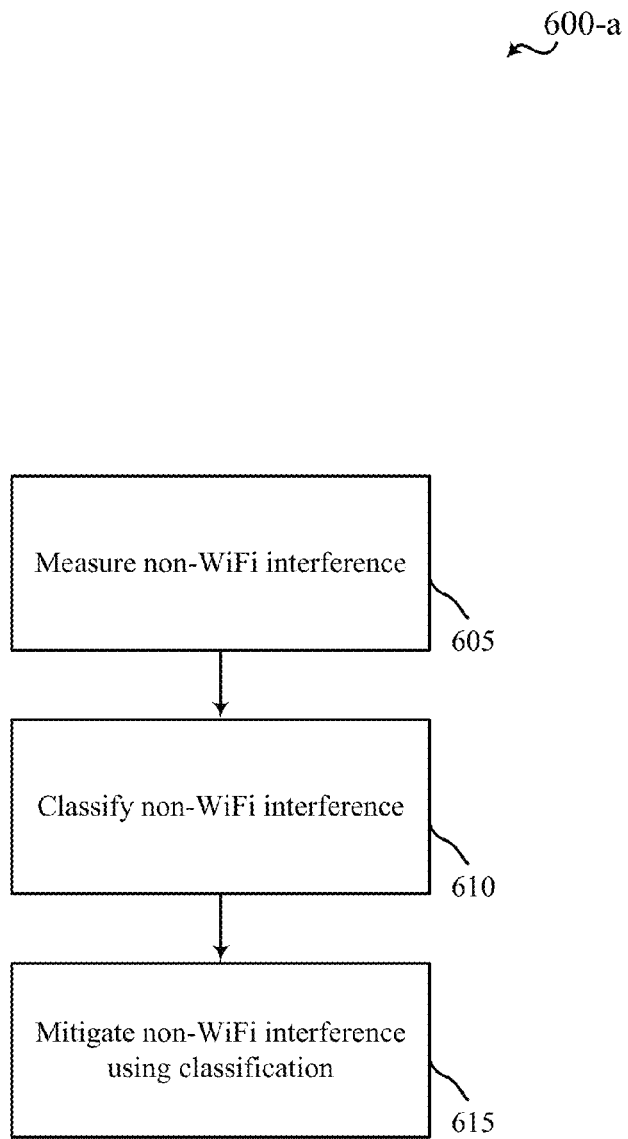
FIG. 6A shows an example of a flowchart illustrating a method that may be used to mitigate non-Wi-Fi interference.

FIG. 6A is a flowchart illustrating an example of a method 600-*a* that may be used to mitigate non-Wi-Fi interference. For clarity, the method 600-*a* is described below with reference to one of the wireless devices and/or APs shown in FIG. 1. In one embodiment, one of the wireless devices and/or its serving AP may execute one or more sets of codes to control the functional elements of the device and/or its serving AP to perform the functions described below.

The presence of non-Wi-Fi interference may be determined in any suitable manner. For example, a device suffering poor performance but not suffering from ACI may be considered to be suffering from non-Wi-Fi interference, such as described above with respect to FIGS. 2E and 4B.

At block 605, the non-Wi-Fi interference may be measured, for example, as interference power or SINR. Any signal not recognized as Wi-Fi signal may be treated as non-Wi-Fi signal, and the power of such signal may be measured per tone across time. Next at block 610, the non-Wi-Fi interference may be classified based on characteristics of non-Wi-Fi interference measured (e.g., narrowband, frequency-hopping, etc.). Then at block 615, the non-Wi-Fi interference may be mitigated using the classification thereof.

In some embodiments, the suffering station may report the characteristics of the measured and classified non-Wi-Fi interference to its serving AP to determine the mitigation approach/technique that may be most suitable. For narrow band interference, the suffering device and/or its serving AP may mitigate the interference by channel switching (e.g., tuning away from the interference or the interfering channel (when identified)) or by using a partial bandwidth for the operating channel of the suffering device, such as described above for ACI mitigation. For frequency hopping interference, the suffering device and/or its serving AP may mitigate the interference by adapting the operating channel to be orthogonal to the interference if the interference has a predictable hopping pattern.

Figure 6B:
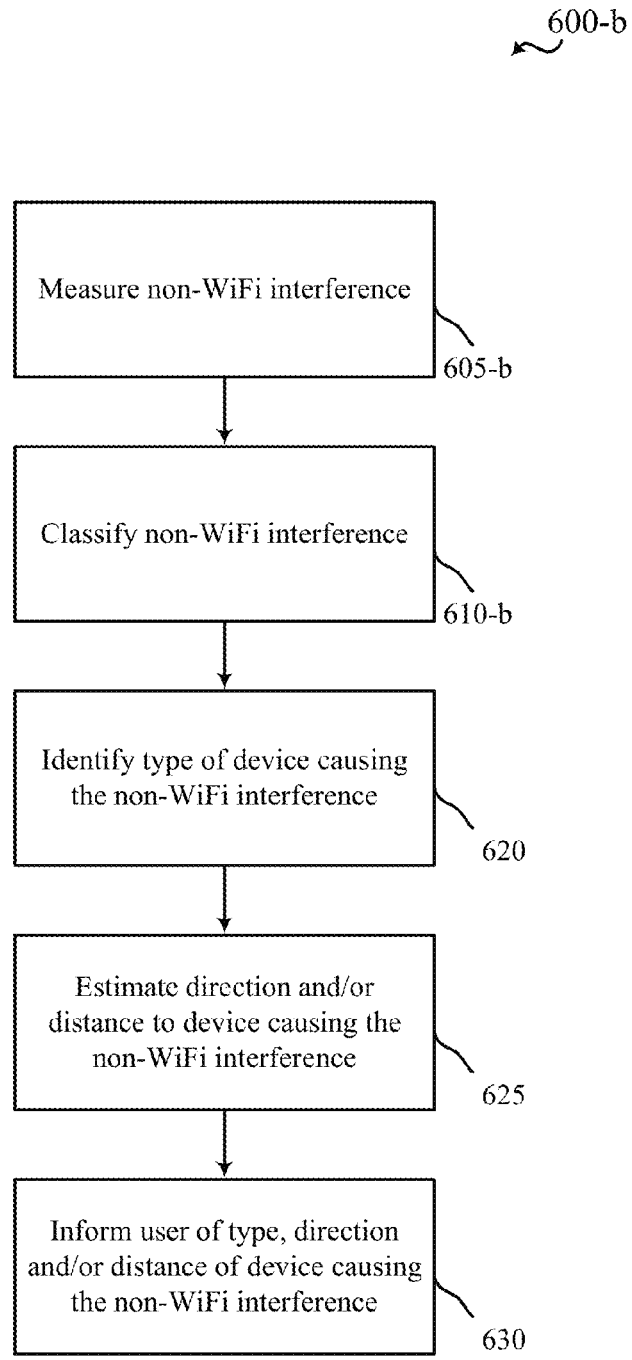
FIG. 6B shows an example of a flowchart illustrating another method that may be used to mitigate non-Wi-Fi interference.

FIG. 6B is a flowchart illustrating another example of a method 600-*b* that may be used to mitigate non-Wi-Fi interference. For clarity, the method 600-*b* is described below with reference to one of the wireless devices and/or APs shown in FIG. 1. Again, one of the wireless devices and/or its serving AP may execute one or more sets of codes to control the functional elements of the device and/or its serving AP to perform the functions described below.

At block 605-*b*, the non-Wi-Fi interference may be measured, such as described above with respect to block 605 of FIG. 6A. Next at block 610-*b*, the non-Wi-Fi interference may be classified based on a type/types of non-Wi-Fi interference measured, such as described above with respect to block 610 of FIG. 6A. Then at block 620, the type of device causing the Wi-Fi interference may be identified based at least in part on the interference type classification. For example, the signal of a residential microwave oven is centered around 2.45 GHz with a 2 to 6 MHz bandwidth and is active for about 8 ms every 20 ms or so. A Bluetooth device has a signal with a 1 MHz bandwidth that randomly hops across time. These different characteristics may be used to determine the interference type classification. Further, the direction and/or the distance to the device causing the non-Wi-Fi interference may be estimated or otherwise determined The suffering device may be equipped with multiple antennas or with a directional antenna, which may be used to detect the incoming direction the signal of the non-WiFi interfereing device. The location of non-WiFi interfering device can be jointly estimated by at least two devices, which may individually estimate the incoming direction of the signal of the non-WiFi interfering device, with the intersection of the two incoming directions from the perspective of the two devices yielding the location. The two devices may be, for example, the suffering device and its serving AP.

The suffering device may inform the user to turn off non-Wi-Fi devices (e.g., non-Wi-Fi devices that are nearby and are suspected of causing interference). This may be performed by an audible alarm and/or a message displayed to the user. The message may inform the user of the type, direction and/or distance of the device(s) causing the non-Wi-Fi interference, at block 630. For example, the type, direction and/or distance may be displayed on a map generated by the suffering device. Such a map may be oriented in accordance with the orientation of the suffering device and may also indicate the current location of the suffering device. Further, the map may update its orientation and the positions (e.g., direction and distance) of the suffering device and the interfering device(s) and the suffering device and/or the interfering device(s) are moved, which may assist the user with finding the interfering device(s) to turn them off.

Figure 6C:
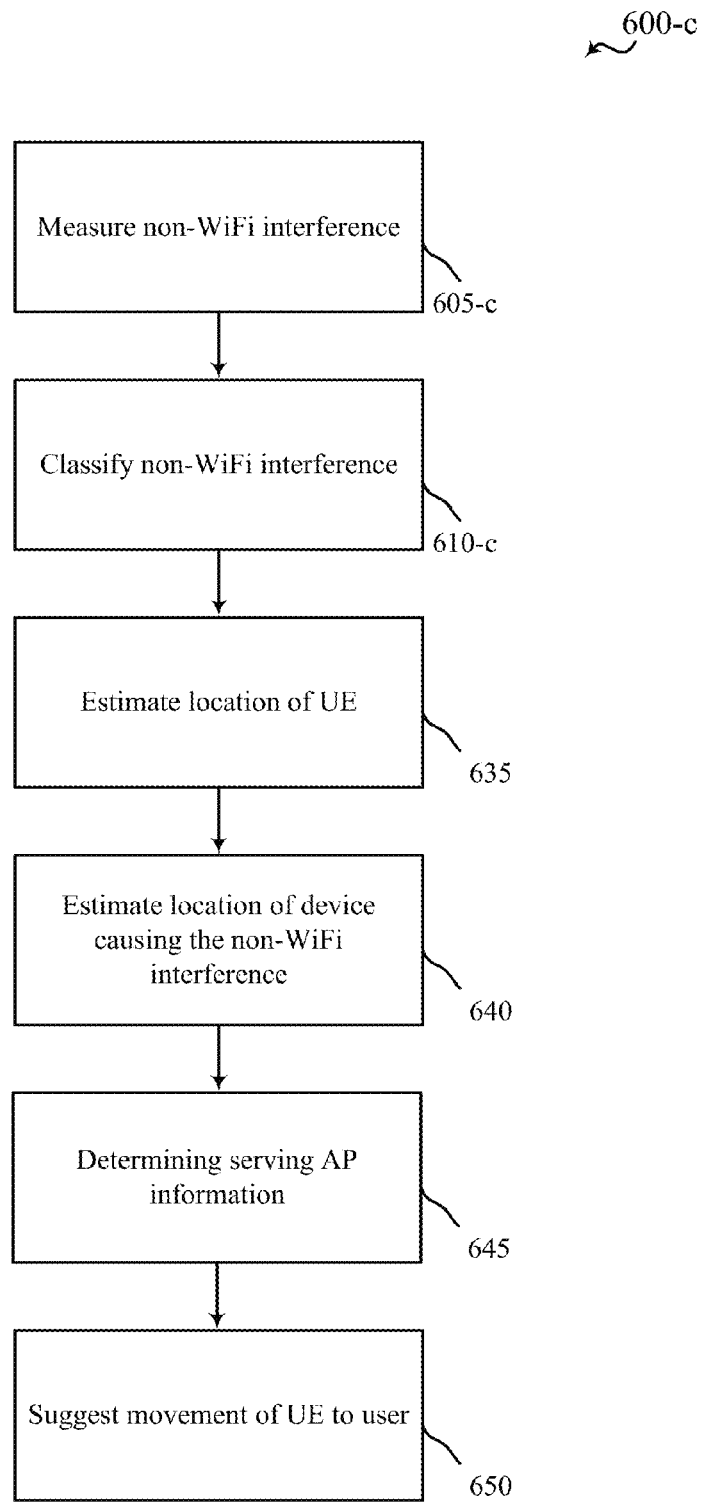
FIG. 6C shows an example of a flowchart illustrating another method that may be used to mitigate non-Wi-Fi interference.

FIG. 6C is a flowchart illustrating another example of a method 600-*c* that may be used to mitigate non-Wi-Fi interference. For clarity, the method 600-*c* is described below with reference to one of the wireless devices and/or APs shown in FIG. 1. Again, one of the wireless devices and/or its serving AP may execute one or more sets of codes to control the functional elements of the device and/or its serving AP to perform the functions described below.

At block 605-*c*, the non-Wi-Fi interference may be measured, such as described above with respect to block 605 of FIG. 6A. Next at block 610-*c*, the non-Wi-Fi interference may be classified based on a type/types of non-Wi-Fi interference measured, such as described above with respect to block 610 of FIG. 6A. Then at block 635, the location of the suffering UE (suffering wireless device) may be estimated (e.g., using location services of the UE, such as GPS). At block 640, the location of the device(s) causing the non-Wi-Fi interference may be estimated (e.g., using the location of the suffering UE and the direction and distance of the interfering device(s) from the suffering UE). type of device causing the Wi-Fi interference may be identified based at least in part on the interference type classification. At block 645, information regarding AP serving the suffering device may be determined (e.g., the AP may broadcast its location coordinates). Information regarding the APs may be provided to the suffering UE by its serving AP.

Then at block 650, the suffering UE may suggest movement of the suffering UE to the user to mitigate the non-Wi-Fi interference. The suffering UE may suggest that the user move (the UE or with the UE) from the current location to another location with less interference (e.g., to another side of the serving AP, to be further away from the interfering device(s), etc.). As above, this may be performed by an audible alarm and/or a message displayed to the user. The suffering device may estimate one or more desired locations for the user to move to, which may be displayed on a map generated by the suffering device. The estimation of desired locations may be based, at least in part, on the location of the suffering UE, an estimated location of the interfering device(s), the location of the AP serving the suffering UE, the accessible area within the coverage area of the serving AP, as well as locations and/or channels (to help avoid ACI) of neighboring APs.

Although not included in the description above with respect to ACI mitigation, it should be understood that an approach involving suggesting movement of the UE to another location with less interference may also be applicable to mitigating ACI. Thus, the features described above with respect to FIG. 6C may be implemented alone or in combination with other features described above with respect to FIGS. 2A, 2B, 2C, 2D, 2E, 3A, 3B, 4A, 4B, 5A and/or 5B for ACI mitigation.

The methods illustrated in FIGS. 6A, 6B and 6C and described above are related such that various aspects thereof may be combined to obtain other methods not specifically illustrated. Not all permutations are illustrated for the sake of clarity and brevity. However, those skilled in the art will readily appreciate other methods involving the operations depicted and described are possible based on this description. Further, it should be understood that not all operations may necessarily be performed to carry out an effective method of Wi-Fi interference mitigation.

Figure 7A:
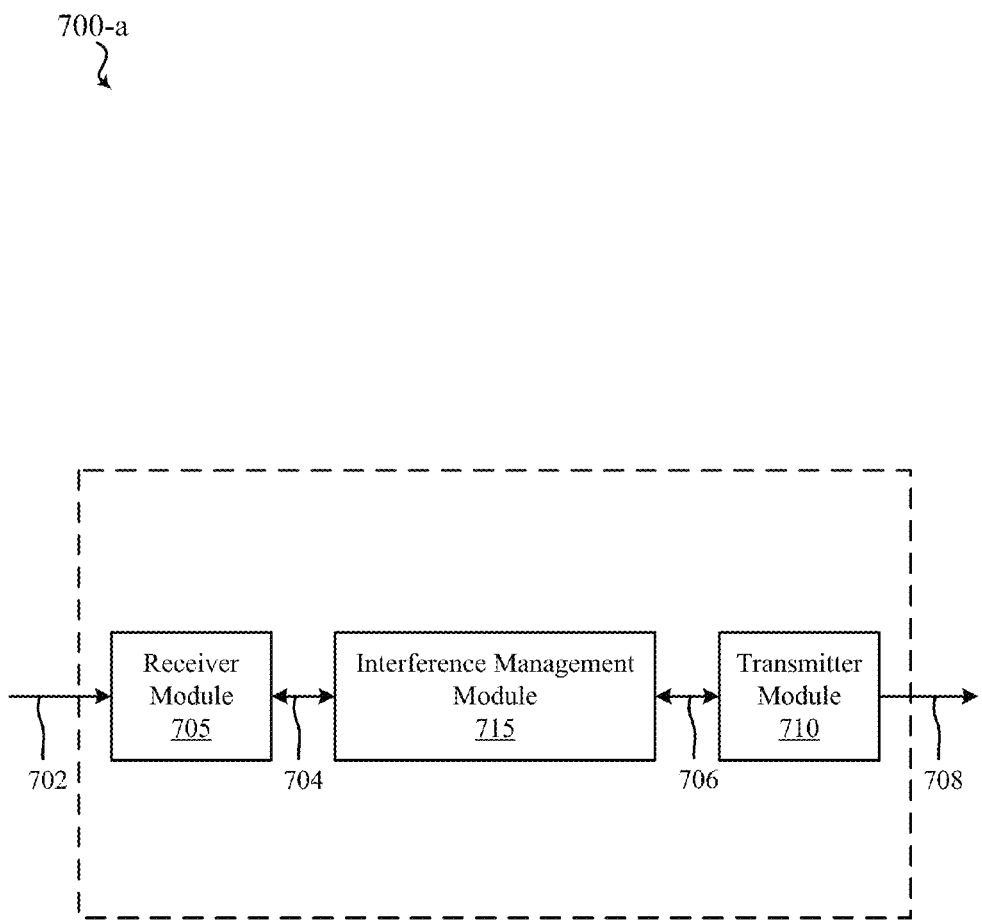
FIG. 7A shows a block diagram of an example of a wireless communications device.

FIG. 7A shows a block diagram 700-*a* of a device 115-*g* for use in wireless communications according to various embodiments. In some embodiments, the device 115-*g* may be an example of one or more aspects of one of the wireless devices 115 described with reference to FIG. 1, and may be configured to perform one or more of the various operations of the methods described with reference to FIGS. 2A, 2B, 2C, 2D, 2E, 3A, 3B, 4A, 4B, 5A, 5B, 6A, 6B and/or 6C. The device 115-*g*, or portions of it, may also be a processor. The device 115-*g* may include a receiver module 705, a transmitter module 710 and an interference management module 715. Each of these components may be in communication with each other.

The components of the device 115-*g* may, individually or collectively, be implemented with one or ASICs adapted to perform some or all of the applicable functions in hardware. Alternatively, the functions may be performed by one or more other processing units (or cores), on one or more integrated circuits. In other embodiments, other types of integrated circuits may be used (e.g., Structured/Platform ASICs, FPGAs, and other Semi-Custom ICs), which may be programmed in any manner known in the art. The functions of each unit may also be implemented, in whole or in part, with instructions embodied in a memory, formatted to be executed by one or more general or application-specific processors.

In some embodiments, the receiver module 705 may be or include an RF receiver. The RF receiver may include separate receivers for different bands. For example, the RF receiver may include a receiver (e.g., part of a radio or modem) operable to receive transmissions via one or more signals 702 in one or more Wi-Fi bands (e.g., 2.4 GHz, 5 GHz). The receiver module 705 may be used to receive various types of data and/or control signals (e.g., transmissions) over one or more communication links of a wireless communications system, such as one or more communication links of WLAN or Wi-Fi networks described with reference to FIG. 1.

In some embodiments, the transmitter module 710 may be or include an RF transmitter. The RF transmitter may include separate transmitters for different bands. For example, the RF transmitter may include a transmitter (e.g., part of a radio or modem) operable to transmit via one or more signals 708 in one or more Wi-Fi bands (e.g., 2.4 GHz, 5 GHz). The transmitter module 710 may be used to transmit various types of data and/or control signals (e.g., transmissions) over one or more communication links of a wireless communications system, such as one or more communication links of the WLAN or Wi-Fi networks described with reference to FIG. 1.

In some embodiments, the interference management module 715 may be configured to detect poor performance of the device 115-*g*, although any suitable component such as those known in the art for monitoring or otherwise determining poor performance of a wireless communication device may be employed. The interference management module 715 may be configured to perform detection of interference (e.g., ACI and/or non-Wi-Fi interference), as well as mitigation of detected interference (e.g., tuning to a different channel as described herein), either alone or in conjunction with the receiver module 705 via one or more signals 704 and/or the transmitter module 710 via one or more signals 706. In general, the interference management module 715 may be configured to perform any or all of the operations/functions described with respect to the methods illustrated in FIGS. 2A, 2B, 2C, 2D, 2E, 3A, 3B, 4A, 4B, 5A, 5B, 6A, 6B and 6C.

Figure 7B:
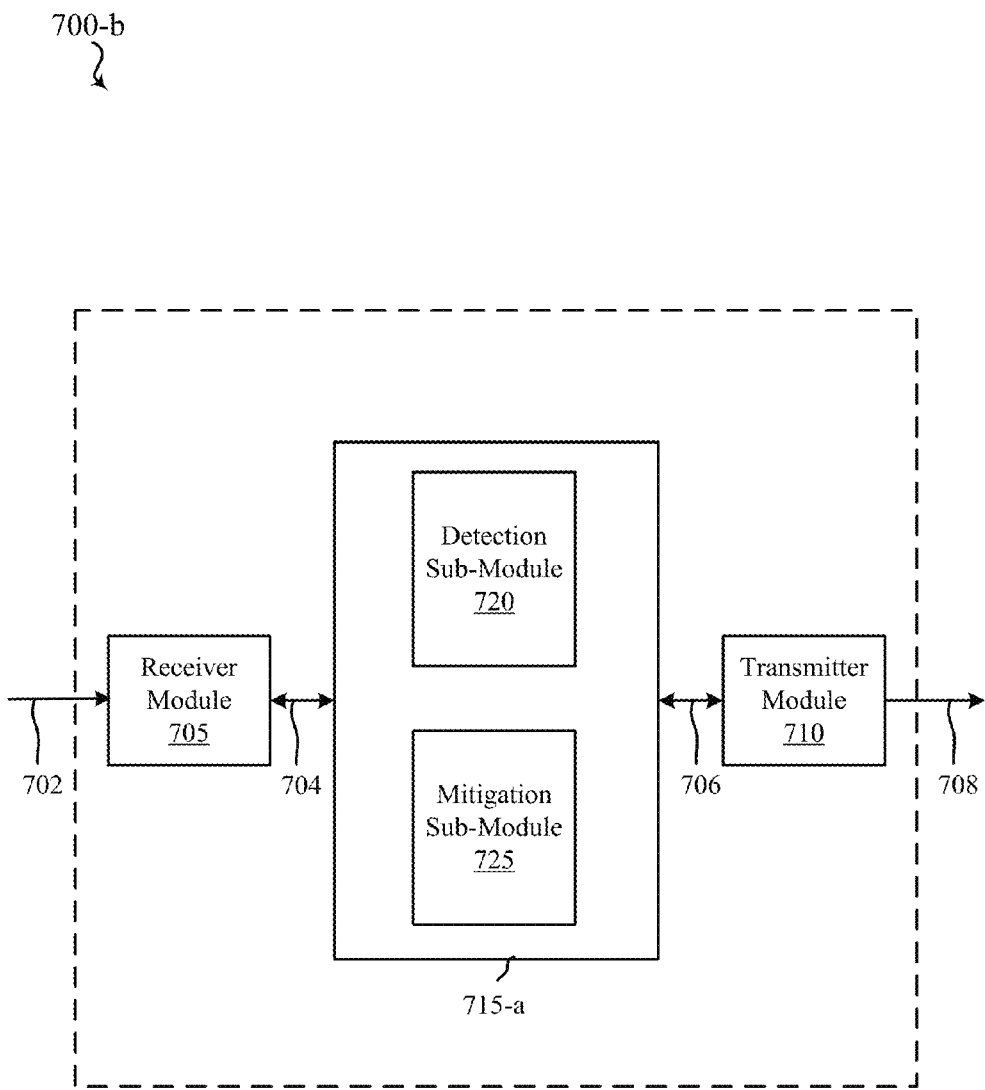
FIG. 7B shows a block diagram of another example of a wireless communications device.

FIG. 7B shows a block diagram 700-*b* of a device 115-*h* for use in wireless communications according to various embodiments. In some embodiments, the device 115-*h* may be an example of one or more aspects of one of the wireless devices 115 described with reference to FIG. 1, and may be configured to perform one or more of the various operations of the methods described with reference to FIGS. 2A, 2B, 2C, 2D, 2E, 3A, 3B, 4A, 4B, 5A, 5B, 6A, 6B and/or 6C. The device 115-*h*, or portions of it, may also be a processor. The device 115-*h* may include a receiver module 705 and a transmitter module 710 as described above with respect to FIG. 7A. The device 115-*h* may also include an interference management module 715-*a*. Each of these components may be in communication with each other.

The components of the device 115-*h* may, individually or collectively, be implemented with one or ASICs adapted to perform some or all of the applicable functions in hardware. Alternatively, the functions may be performed by one or more other processing units (or cores), on one or more integrated circuits. In other embodiments, other types of integrated circuits may be used (e.g., Structured/Platform ASICs, FPGAs, and other Semi-Custom ICs), which may be programmed in any manner known in the art. The functions of each unit may also be implemented, in whole or in part, with instructions embodied in a memory, formatted to be executed by one or more general or application-specific processors.

In general, the interference management module 715-*a* may be configured to perform any or all of the operations/functions described with respect to the methods illustrated in FIGS. 2A, 2B, 2C, 2D, 2E, 3A, 3B, 4A, 4B, 5A, 5B, 6A, 6B and 6C. The interference management module 715-*a* may be configured to perform detection of interference (e.g., ACI and/or non-Wi-Fi interference) and may include a detection sub-module 720 that is specifically configured to carry out the various interference detection operations/functions described herein, either alone or in conjunction with the receiver module 705 via one or more signals 704 and/or the transmitter module 710 via one or more signals 706. The interference management module 715-*a* may be configured to perform mitigation of detected interference and may include a mitigation sub-module 725 that is specifically configured to carry out the various interference mitigation operations/functions described herein (e.g., tuning to a different channel), either alone or in conjunction with the receiver module 705 and/or the transmitter module 710 via one or more signals 704, 706, respectively.

Figure 7C:
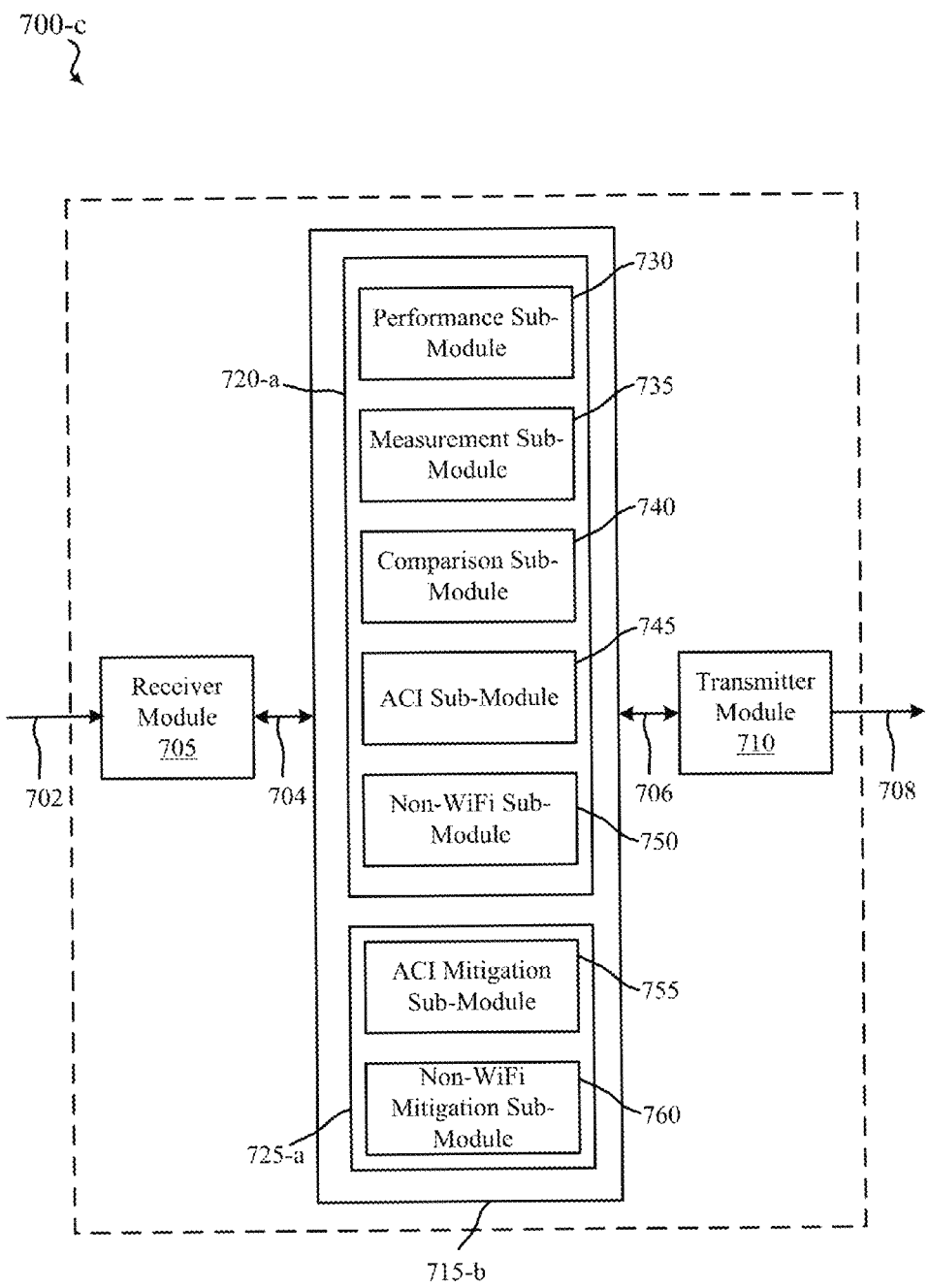
FIG. 7C shows a block diagram of another example of a wireless communications device.

FIG. 7C shows a block diagram 700-*c* of a device 115-*i* for use in wireless communications according to various embodiments. In some embodiments, the device 115-*i* may be an example of one or more aspects of one of the wireless devices 115 described with reference to FIG. 1, and may be configured to perform one or more of the various operations of the methods described with reference to FIGS. 2A, 2B, 2C, 2D, 2E, 3A, 3B, 4A, 4B, 5A, 5B, 6A, 6B and/or 6C. The device 115-*i*, or portions of it, may also be a processor. The device 115-*i* may include a receiver module 705 and a transmitter module 710 as described above with respect to FIG. 7A. The device 115-*i* may also include an interference management module 715-*b*. Each of these components may be in communication with each other.

The components of the device 115-*i* may, individually or collectively, be implemented with one or ASICs adapted to perform some or all of the applicable functions in hardware. Alternatively, the functions may be performed by one or more other processing units (or cores), on one or more integrated circuits. In other embodiments, other types of integrated circuits may be used (e.g., Structured/Platform ASICs, FPGAs, and other Semi-Custom ICs), which may be programmed in any manner known in the art. The functions of each unit may also be implemented, in whole or in part, with instructions embodied in a memory, formatted to be executed by one or more general or application-specific processors.

In general, the interference management module 715-*b* may be configured to perform any or all of the operations/functions described with respect to the methods illustrated in FIGS. 2A, 2B, 2C, 2D, 2E, 3A, 3B, 4A, 4B, 5A, 5B, 6A, 6B and 6C. The interference management module 715-*b* may be configured to perform detection of interference and may include a detection sub-module 720-*a*. The interference management module 715-*b* may be configured to perform mitigation of detected interference and may include a mitigation sub-module 725-*a*.

The detection sub-module 720-*a* may include a performance sub-module 730, a measurement sub-module 735, a comparison sub-module 740, an ACI sub-module 745 and/or a non-Wi-Fi sub-module 750. Each of these components may be in communication with each other.

The performance sub-module 730 may be configured to detect, monitor or otherwise determine performance characteristics of the device 115-*i*. Such functionality may be performed by the performance sub-module 730 in conjunction with the measurement sub-module 735 and the comparison sub-module 740. For example, the performance sub-module 730 may monitor various performance metrics of the device 115-*i*, and may use the measurement sub-module 735 to determine values of such metrics either periodically or on a continual basis. The performance sub-module 730, or the measurement sub-module 735, may provide the determined values to the comparison sub-module 740. The comparison sub-module 740 may be configured to compare individual metrics to corresponding thresholds. Alternatively or additionally, one or more of the metrics may be aggregated in any suitable manner to provide an overall performance value, for example, by the performance sub-module 730. In such case, the comparison sub-module 740 may be configured to compare the overall performance value to a corresponding threshold. The performance sub-module 730 may further be configured to determine if the device 115-*i* is experiencing poor performance using the result(s) of the comparison(s).

In some embodiments, the performance sub-module 730 may be configured to receive performance characteristics or metrics for the device 115-*i* from its serving AP or any other suitable source configured to determine the characteristics/metrics. In other embodiments, the performance sub-module 730 may be configured to receive measured values of the metrics or comparison results for the metrics from its serving AP or any other suitable source configured to make such measurements and/or comparisons. Further, in other embodiments, the performance sub-module 730 may be configured to receive a determination that the device is suffering from interference from its serving AP or any other suitable source configured to make such a determination.

The ACI sub-module 745 may be configured to detect or otherwise determine if the device 115-*i* is suffering from ACI. Further, the ACI sub-module 745 may be configured to determine a suitable technique to mitigate the ACI. The determination of the technique may be performed by the ACI sub-module 745 in conjunction with the receiver module 705, the transmitter module 710, the measurement sub-module 735 and/or the comparison sub-module 740, for example, to carry out any of the respective operations/functions described above with respect to FIGS. 1, 2A, 2B, 2C, 2D, 2E, 3A, 3B, 4A, 4B, 5A and 5B.

The non-Wi-Fi sub-module 750 may be configured to detect or otherwise determine if the device 115-*i* is suffering from non-Wi-Fi interference. As described above for some embodiments, the device 115-*i* may be determined to be suffering from non-Wi-Fi interference when it has poor performance but is not suffering from ACI. Thus, the non-Wi-Fi sub-module 750 may be configured to determine if the device 115-*i* is suffering from non-Wi-Fi interference based at least in part on a determination by the ACI sub-module 745 that the device 115-*i* is not suffering from ACI.

Further, the non-Wi-Fi sub-module 750 may be configured to determine a suitable technique to mitigate the non-Wi-Fi interference. The determination of the technique may be performed by the non-Wi-Fi sub-module 750 in conjunction with the receiver module 705, the transmitter module 710, the measurement sub-module 735 and/or the comparison sub-module 740, for example, to carry out any of the respective operations/functions described above with respect to FIGS. 1, 6A, 6B and 6C.

The mitigation sub-module 725-*a* may include an ACI mitigation sub-module 755 and/or a non-Wi-Fi mitigation sub-module 760. Each of these components may be in communication with each other.

The ACI mitigation sub-module 755 may be configured to implement the technique to mitigate the ACI determined by the ACI sub-module 745 of the detection sub-module 720-*a*. Alternatively, the ACI mitigation sub-module 755 may be configured to determine the ACI mitigation technique to implement as well. In such case, the ACI sub-module 745 of the detection sub-module 720-*a* may be configured to act as a controller for detecting ACI, controlling the performance sub-module 730, the measurement sub-module 735 and the comparison sub-module 740 to carry out any of the respective operations/functions described above with respect to FIGS. 1, 2A, 2B, 2C, 2D, 2E, 3A, 3B, 4A, 4B, 5A and 5B.

The non-Wi-Fi mitigation sub-module 760 may be configured to implement the technique to mitigate the non-Wi-Fi interference determined by the non-Wi-Fi sub-module 750 of the detection sub-module 720-*a*. Alternatively, the non-Wi-Fi mitigation sub-module 760 may be configured to determine the non-Wi-Fi interference mitigation technique to implement as well. In such case, the non-Wi-Fi sub-module 750 of the detection sub-module 720-*a* may be configured to act as a controller for detecting non-Wi-Fi interference, controlling the performance sub-module 730, the measurement sub-module 735 and the comparison sub-module 740 to carry out any of the respective operations/functions described above with respect to FIGS. 1, 6A, 6B and 6C.

Figure 8:
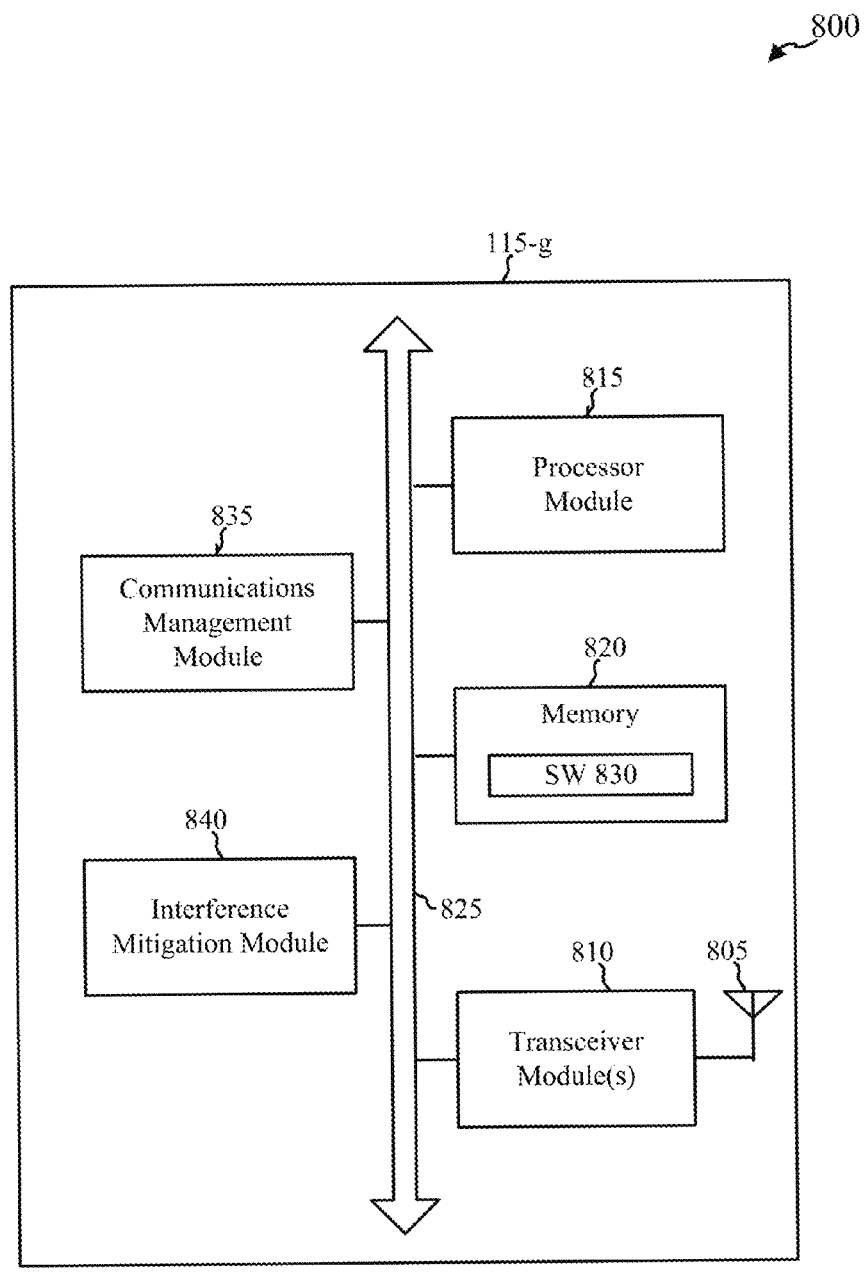
FIG. 8 shows a block diagram illustrating an example of hardware that may be used to implement a device for mitigating interference.

FIG. 8 shows a diagram 800 that illustrates a wireless device 115-*j* configured for handling interference. The wireless device 115-*j* may have various other configurations and may be included or be part of a personal computer (e.g., laptop computer, netbook computer, tablet computer, etc.), a cellular telephone, a PDA, a digital video recorder (DVR), an internet appliance, a gaming console, an e-readers, etc. The wireless device 115-*j* may have an internal power supply (not shown), such as a small battery, to facilitate mobile operation. The wireless device 115-*j* may be an example of the UEs/ wireless devices 115 of FIGS. 1, 7A, 7B, and/or 7C. The wireless device 115-*j* may be configured to implement at least some of the features and functions described above with respect to FIGS. 1-7C.

The wireless device 115-*j* may include a transceiver module 810, a processor 815, a memory 820, a communications management module 835 and an interference mitigation module 840. Each of these components may be in communication with each other, directly or indirectly, over one or more buses 825. The interference mitigation module 840 may be an example of the interference management module 715 of FIGS. 7A, 7B and/or 7C. The transceiver module 810 may be an implementation of the receiver module 705 and the transmitter module 710 of FIGS. 7A, 7B and/or 7C.

The memory 820 may include random access memory (RAM) and read-only memory (ROM). The memory 820 may store computer-readable, computer-executable software (SW) code 830 containing instructions that are configured to, when executed, cause the processor 815 to perform various functions described herein for mitigating interference experienced by the device 115-*j*. Alternatively, the software code 830 may not be directly executable by the processor 815 but be configured to cause a computer (e.g., when compiled and executed) to perform functions described herein.

The processor 815 may include an intelligent hardware device, e.g., a central processing unit (CPU), a microcontroller, an ASIC, etc. The processor 815 may process information received through the transceiver module 810 via one or more antennas 805. The processor 815 may process information to be sent to the transceiver module 810 for transmission through the antennas 805. The processor 815 may handle, alone or in conjunction with the interference mitigation module 840, various aspects of handling interference experienced by the device 115-*j*.

The transceiver module 810 may be configured to communicate bi-directionally with access points (e.g., access points 105). The transceiver module 810 may be implemented as one or more transmitters and one or more separate receivers. The transceiver module 810 may support communications with a WLAN or Wi-Fi network. The transceiver module 810 may include a modem configured to modulate the packets and provide the modulated packets to the antennas 805 for transmission, and to demodulate packets received from the antennas 805, under control by or otherwise in conjunction with the communications management module 835.

The communications management module 835 may manage communications with various base stations and/or access points. The communications management module 835 may be a component of the wireless terminal 115-*j* in communication with some or all of the other components of the wireless terminal 115-*j* over the one or more buses 825. Alternatively, functionality of the communications management module 835 may be implemented as a component of the transceiver module 810, as a computer program product, and/or as one or more controller elements of the processor 815.

Techniques described herein may be used for various wireless communications systems such as CDMA, TDMA, FDMA, OFDMA, SC-FDMA, and other systems. The terms "system" and "network" are often used interchangeably. A CDMA system may implement a radio technology such as CDMA2000, Universal Terrestrial Radio Access (UTRA), etc. CDMA2000 covers IS-2000, IS-95, and IS-856 standards. IS-2000 Releases 0 and A are commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM). An OFDMA system may implement a radio technology such as Ultra Mobile Broadband (UMB), Evolved UTRA (E-UTRA), IEEE 802.11 (Wi-Fi), IEEE 802.16 (WiMAX), IEEE 802.20, Flash-OFDM, etc. UTRA and E-UTRA are part of Universal Mobile Telecommunication System (UMTS). 3GPP Long Term Evolution (LTE) and LTE-Advanced (LTE-A) are new releases of UMTS that use E-UTRA. UTRA, E-UTRA, UMTS, LTE, LTE-A, and GSM are described in documents from an organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies. The description above, however, describes an LTE system for purposes of example, and LTE terminology is used in much of the description above, although the techniques are applicable beyond LTE applications.

The detailed description set forth above in connection with the appended drawings describes exemplary embodiments and does not represent the only embodiments that may be implemented or that are within the scope of the claims. The term "exemplary" used throughout this description means "serving as an example, instance, or illustration," and not "preferred" or "advantageous over other embodiments." The detailed description includes specific details for the purpose of providing an understanding of the described techniques. These techniques, however, may be practiced without these specific details. In some instances, well-known structures and devices are shown in block diagram form in order to avoid obscuring the concepts of the described embodiments.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, multiple microprocessors, one or more microprocessors in conjunction with a DSP core, or any other such configuration.

The functions described herein may be implemented in hardware, software executed by a processor, firmware, or any combination thereof If implemented in software executed by a processor, the functions may be stored on or transmitted over as one or more instructions or code on a computer-readable medium. Other examples and implementations are within the scope and spirit of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items prefaced by "at least one of" indicates a disjunctive list such that, for example, a list of "at least one of A, B, or C" means A or B or C or AB or AC or BC or ABC (i.e., A and B and C).

Computer-readable media includes both computer storage media and communication media including any medium that facilitates transfer of a computer program from one place to another. A storage medium may be any available medium that can be accessed by a general purpose or special purpose computer. By way of example, and not limitation, computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk and blu-ray disc where disks usually reproduce data magnetically, while discs reproduce data optically with lasers. Combinations of the above are also included within the scope of computer-readable media.

The previous description of the disclosure is provided to enable a person skilled in the art to make or use the disclosure. Various modifications to the disclosure will be readily apparent to those skilled in the art, and the generic principles defined herein may be applied to other variations without departing from the spirit or scope of the disclosure. Throughout this disclosure the term "example" or "exemplary" indicates an example or instance and does not imply or require any preference for the noted example. Thus, the disclosure is not to be limited to the examples and designs described herein but is to be accorded the widest scope consistent with the principles and novel features disclosed herein.

What is claimed is:

1. A method performed by a device of a Wi-Fi network for mitigating interference, comprising:
   detecting adjacent channel interference (ACI) in an operating channel of the device;
   determining a location of the detected ACI in an operating band of the device;
   determining a first side of the operating channel on the operating band, wherein the detected ACI is located on the first side; and
   mitigating the detected ACI by communicating via a different channel located on a second side of the operating channel on the operating band, wherein the second side is opposite the first side, the different channel being determined to be further away from the location of the detected ACI.

2. The method of claim 1, wherein the determining the location of the detected ACI comprises:
   identifying at least one ACI channel as a channel contributing to the detected ACI.

3. The method of claim 2, wherein identifying the at least one ACI channel comprises:
   tuning to non-operating channels to identify one or more channels contributing to the detected ACI.

4. The method of claim 1, wherein the determining the location of the detected ACI comprises:
   communicating with at least one other device over a common control channel to obtain information regarding at least one ACI channel contributing to the detected ACI.

5. The method of claim 1, wherein the mitigating the detected ACI comprises:
   determining the different channel; and
   tuning to the different channel.

6. The method of claim 1, further comprising:
   mitigating the detected ACI by tuning to the different channel based at least in part on a message received from an access point serving the device.

7. The method of claim 1, further comprising:
   detecting non-Wi-Fi interference; and
   mitigating the non-Wi-Fi interference based at least in part on an interference type classification of the non-Wi-Fi interference.

8. The method of claim 1, further comprising:
   detecting non-Wi-Fi interference; and mitigating the non-Wi-Fi interference by indicating for a user to take an action to mitigate the non-Wi-Fi interference.

9. The method of claim 8, wherein the indicating for the user to take the action comprises:
indicating for the user to turn off at least one of a non-Wi-Fi device and a non-WiFi application.

10. The method of claim 8, wherein the indicating for the user to take the action comprises:
indicating for the user to move away from a current location.

11. The method of claim 10, wherein the indicating for the user to move away from the current location comprises:
indicating for the user to move to a location identified as having less non-Wi-Fi interference.

12. A device of a Wi-Fi network, comprising:
means for detecting adjacent channel interference (ACI) in an operating channel of the device;
means for determining a location of the detected ACI in an operating band of the device;
means for determining a first side of the operating channel on the operating band, wherein the detected ACI is located on the first side; and
means for mitigating the detected ACI by communicating via a different channel located on a second side of the operating channel on the operating band, wherein the second side is opposite the first side, the different channel being determined to be further away from the location of the detected ACI.

13. The device of claim 12, wherein:
the means for determining the location of the detected ACI is configured to identify at least one ACI channel as a channel contributing to the detected ACI; and
the means for mitigating the detected ACI is configured to mitigate the ACI by communicating via a channel different from the operating channel, the different channel being determined to be further away from the at least one ACI channel.

14. The device of claim 13, wherein the means for determining the location of the detected ACI is configured to identify at least one ACI channel as a channel contributing to the detected ACI by tuning to non-operating channels to identify one or more channels causing the ACI.

15. The device of claim 12, further comprising:
means for determining the different channel; and
means for tuning to the different channel.

16. A device of a Wi-Fi network, the device comprising:
a processor;
memory in electronic communication with the processor; and
instructions stored in the memory, the instructions being executable by the processor to:
detect adjacent channel interference (ACI) in an operating channel of the device;
determine a location of the detected ACI in an operating band of the device;
determine a first side of the operating channel on the operating band, wherein the detected ACI is located on the first side; and
mitigate the detected ACI by communicating via a different channel located on a second side of the operating channel on the operating band, wherein the second side is opposite the first side, the different channel being determined to be further away from the location of the detected ACI.

* * * * *